United States Patent
Matsukawa et al.

(10) Patent No.: US 11,186,485 B2
(45) Date of Patent: Nov. 30, 2021

(54) POLYCRYSTALLINE CUBIC BORON NITRIDE AND METHOD FOR MANUFACTURING THE SAME

(71) Applicant: SUMITOMO ELECTRIC HARDMETAL CORP., Itami (JP)

(72) Inventors: Michiko Matsukawa, Itami (JP); Satoru Kukino, Itami (JP); Taisuke Higashi, Itami (JP); Machiko Abe, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 17/052,831

(22) PCT Filed: Feb. 27, 2020

(86) PCT No.: PCT/JP2020/008156
§ 371 (c)(1),
(2) Date: Nov. 4, 2020

(87) PCT Pub. No.: WO2020/175647
PCT Pub. Date: Sep. 3, 2020

(65) Prior Publication Data
US 2021/0087058 A1    Mar. 25, 2021

(30) Foreign Application Priority Data

Feb. 28, 2019  (JP) .............................. JP2019-036263
Jan. 17, 2020  (WO) ................. PCT/JP2020/001438

(51) Int. Cl.
*H01M 4/02* (2006.01)
*C01B 21/064* (2006.01)
*B23B 27/20* (2006.01)

(52) U.S. Cl.
CPC .......... *C01B 21/0648* (2013.01); *B23B 27/20* (2013.01); *C01P 2002/60* (2013.01); *C01P 2002/76* (2013.01); *C01P 2004/62* (2013.01); *C01P 2006/10* (2013.01); *C01P 2006/80* (2013.01)

(58) Field of Classification Search
CPC ....................................................... H01M 4/02
See application file for complete search history.

(56) References Cited

U.S. PATENT DOCUMENTS

| | | |
|---|---|---|
| 4,188,194 A | 2/1980 | Corrigan |
| 4,289,503 A | 9/1981 | Corrigan |
| 4,673,414 A | 6/1987 | Lavens et al. |

(Continued)

FOREIGN PATENT DOCUMENTS

| | | |
|---|---|---|
| JP | S54-33510 A | 3/1979 |
| JP | S58-2269 A | 1/1983 |

(Continued)

*Primary Examiner* — Jacob B Marks
(74) *Attorney, Agent, or Firm* — Faegre Drinker Biddle & Reath LLP

(57) ABSTRACT

A polycrystalline cubic boron nitride comprising 96% by volume or more of cubic boron nitride, wherein the cubic boron nitride has a dislocation density of $8\times10^{15}/m^2$ or less, the polycrystalline cubic boron nitride comprises a plurality of crystal grains, and the plurality of crystal grains have a median diameter d50 of an equivalent circle diameter of less than 100 nm.

14 Claims, 3 Drawing Sheets

(56) References Cited

U.S. PATENT DOCUMENTS

| | | | |
|---|---|---|---|
| 2009/0169840 A1 | 7/2009 | Okamura et al. | |
| 2018/0029942 A1* | 2/2018 | Ishida | C04B 35/5831 |
| 2019/0248652 A1 | 8/2019 | Ishida et al. | |

FOREIGN PATENT DOCUMENTS

| | | |
|---|---|---|
| JP | S61-17406 A | 1/1986 |
| JP | S62-197357 A | 9/1987 |
| JP | H11-246271 A | 9/1999 |
| JP | 2006-201216 A | 8/2006 |
| JP | 2015-202980 A | 11/2015 |
| JP | 2016-145131 A | 8/2016 |
| WO | WO-2007/145071 A1 | 12/2007 |
| WO | WO-2018/066261 A1 | 4/2018 |

* cited by examiner

POLYCRYSTALLINE CUBIC BORON NITRIDE AND METHOD FOR MANUFACTURING THE SAME

The present disclosure relates to a polycrystalline cubic boron nitride and a method for manufacturing the same. This application claims priority from Japanese Patent Application No. 2019-036263 filed on Feb. 28, 2019, and International Application PCT/JP2020/001438 filed on Jan. 17, 2020. The entire contents of the Japanese patent application and the international application are incorporated herein by reference.

TECHNICAL FIELD

Background Art

Cubic boron nitride (hereinafter, also referred to as "cBN") has a hardness that is second only to diamond, and also has excellent thermal stability and chemical stability. Therefore, cubic boron nitride sintered bodies have been used as a material for machining tools.

As the cubic boron nitride sintered body, a sintered body including about 10 to 40% by volume of a binder has been used. However, the binder causes the strength and thermal diffusivity of the sintered body to decrease.

To solve this problem, there has been developed a method in which sintering is conducted while simultaneously directly converting a hexagonal boron nitride into cubic boron nitride at ultrahigh pressure and high temperature without using a binder to obtain a binder-free cubic boron nitride sintered body.

Japanese Patent Laying-Open No. 11-246271 (Patent Literature 1) discloses a technique for obtaining a cubic boron nitride sintered body by directly converting and sintering a low-crystallinity hexagonal boron nitride into a cubic boron nitride sintered body under ultrahigh temperature and high pressure.

CITATION LIST

Patent Literature

PTL 1: Japanese Patent Laying-Open No. 11-246271

SUMMARY OF INVENTION

A polycrystalline cubic boron nitride of the present disclosure is a polycrystalline cubic boron nitride comprising 96% by volume or more of cubic boron nitride, wherein
the cubic boron nitride has a dislocation density of $8 \times 10^{15}/m^2$ or less,
the polycrystalline cubic boron nitride comprises a plurality of crystal grains, and
the plurality of crystal grains have a median diameter d50 of an equivalent circle diameter of less than 100 nm.

A method for manufacturing a polycrystalline cubic boron nitride of the present disclosure is a method for manufacturing the above-described polycrystalline cubic boron nitride, comprising:
a first step of preparing a hexagonal boron nitride powder having a median diameter d90 of an equivalent circle diameter of 0.3 μm or less; and
a second step of heating and pressurizing the hexagonal boron nitride powder to a temperature greater than or equal to 1500° C. and less than or equal to 2200° C. and to a pressure greater than or equal to 10 GPa, with the temperature and the pressure passing through a temperature and a pressure in a stable region of a wurtzite boron nitride to obtain the polycrystalline cubic boron nitride, wherein
the stable region of wurtzite boron nitride is, when the temperature is represented as T° C. and the pressure as P GPa, a region that simultaneously satisfies the following Formula 1 and Formula 2, $$P \geq -0.0037T + 11.301 \quad \text{Formula 1:}$$

$$P \leq -0.085T + 117 \quad \text{Formula 2:}$$

and in the heating and pressurizing path of the second step, an entry temperature into the stable region of wurtzite boron nitride is 900° C. or more.

A method for manufacturing a polycrystalline cubic boron nitride of the present disclosure is a method for manufacturing the above-described polycrystalline cubic boron nitride, comprising:
a step A of preparing pyrolytic boron nitride; and
a step B of heating and pressurizing the pyrolytic boron nitride to a temperature and a pressure in a final sintering region, with the temperature and the pressure passing through a temperature and a pressure in a stable region of a wurtzite boron nitride to obtain the polycrystalline cubic boron nitride, wherein
the stable region of wurtzite boron nitride is, when the temperature is represented as T° C. and the pressure as P GPa, a region that simultaneously satisfies the following Formula 1 and Formula 2, $$P \geq -0.0037T + 11.301 \quad \text{Formula 1:}$$

$$P \leq -0.085T + 117 \quad \text{Formula 2:}$$

the final sintering region is, when the temperature is represented as T° C. and the pressure as P GPa, a region that simultaneously satisfies the following Formula 3, Formula 4, and Formula 5, $$P \geq 12 \quad \text{Formula 3:}$$

$$P \geq -0.085T + 151 \quad \text{Formula 4:}$$

$$P \leq -0.085T + 202 \quad \text{Formula 5:}$$

and in the heating and pressurizing path of step B, an entry temperature into the stable region of wurtzite boron nitride is 900° C. or more.

DESCRIPTION OF EMBODIMENTS

Figure 1:
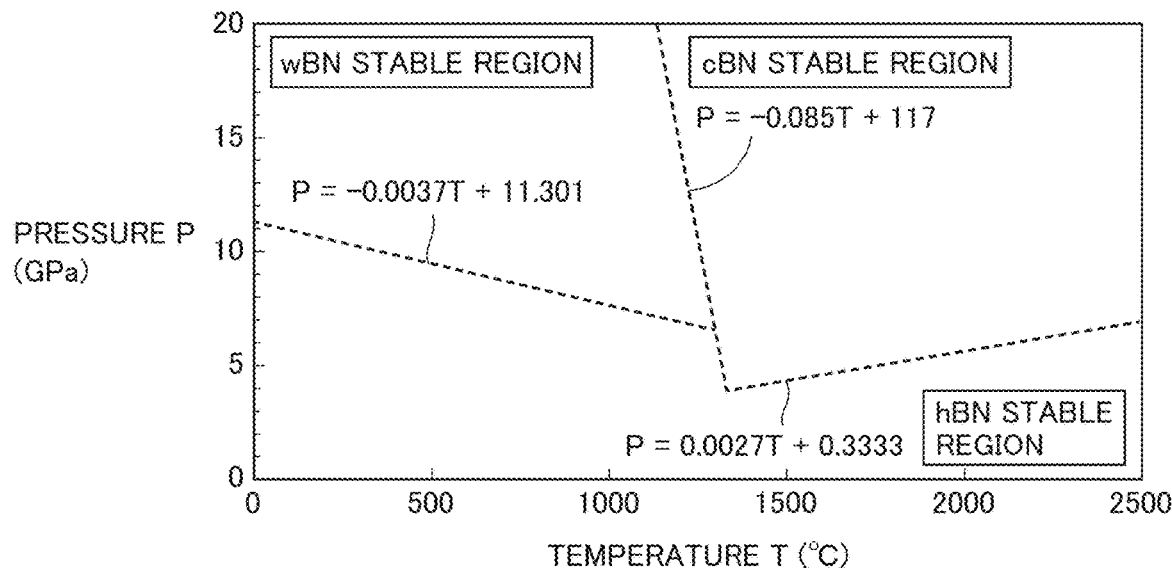
FIG. 1 is a pressure-temperature phase diagram of boron nitride.

[Problem to be Solved by Present Disclosure]

In recent years, precision machining is being increasingly used, particularly in the field of molds. When a polycrystalline cubic boron nitride is used for precision machining, a blade edge tends to be damaged and tool life tends to be shortened. Therefore, there is a need for a tool capable of exhibiting an excellent tool life even in precision machining.

Accordingly, an object of the present invention is to provide a polycrystalline cubic boron nitride that can have a long tool life when used as a tool, particularly when used in precision machining.

Advantageous Effects of Present Disclosure

According to the present disclosure, the polycrystalline cubic boron nitride can have a long tool life when used as a tool, even when used in precision machining.

Description of Embodiments of Present Disclosure

First, the embodiments of the present disclosure will be listed and described.

(1) A polycrystalline cubic boron nitride of the present disclosure is a polycrystalline cubic boron nitride comprising 96% by volume or more of cubic boron nitride, wherein
the cubic boron nitride has a dislocation density of $8 \times 10^{15}/m^2$ or less,
the polycrystalline cubic boron nitride comprises a plurality of crystal grains, and
the plurality of crystal grains have a median diameter d50 of an equivalent circle diameter of less than 100 nm.

According to the present disclosure, the polycrystalline cubic boron nitride can have a long tool life when used as a tool, particularly when used in precision machining.

(2) The dislocation density is preferably $7 \times 10^{15}/m^2$ or less. By having such a dislocation density, the tool has better resistance to damage.

(3) The polycrystalline cubic boron nitride preferably comprises 0.01% by volume or more of hexagonal boron nitride. A tool using this polycrystalline cubic boron nitride can have a better tool life.

(4) The polycrystalline cubic boron nitride preferably comprises 0.01% by volume or more of compressed hexagonal boron nitride. A tool using this polycrystalline cubic boron nitride can have a better tool life.

(5) The polycrystalline cubic boron nitride preferably comprises 0.1% by volume or more of wurtzite boron nitride. A tool using such a polycrystalline cubic boron nitride can have a better tool life.

(6) The polycrystalline cubic boron nitride preferably comprises a total content of an alkali metal element and an alkaline earth metal element of 10 ppm or less in terms of mass. A tool using such a polycrystalline cubic boron nitride can have a better tool life.

(7) It is preferable that the dislocation density be calculated by using a modified Williamson-Hall method and a modified Warren-Averbach method. The dislocation density serves as a good correlation for the performance of the polycrystalline cubic boron nitride.

(8) It is preferable that the dislocation density be measured using synchrotron radiation as an X-ray source. The dislocation density serves as a good correlation for the performance of the polycrystalline cubic boron nitride.

(9) A method for manufacturing the polycrystalline cubic boron nitride of the present disclosure is a method for manufacturing the above-described polycrystalline cubic boron nitride, comprising:
a first step of preparing a hexagonal boron nitride powder having a median diameter d90 of an equivalent circle diameter of 0.3 μm or less; and
a second step of heating and pressurizing the hexagonal boron nitride powder to a temperature greater than or equal to 1500° C. and less than or equal to 2200° C. and to a pressure greater than or equal to 10 GPa, with the temperature and the pressure passing through a temperature and a pressure in a stable region of a wurtzite boron nitride to obtain the polycrystalline cubic boron nitride, wherein
the stable region of wurtzite boron nitride is, when the temperature is represented as T° C. and the pressure as P GPa, a region that simultaneously satisfies the following Formula 1 and Formula 2, $$P \geq -0.0037T + 11.301 \qquad \text{Formula 1:}$$

$$P \leq -0.085T + 117 \qquad \text{Formula 2:}$$

and in the heating and pressurizing path of the second step, an entry temperature into the stable region of wurtzite boron nitride is 900° C. or more.

The polycrystalline cubic boron nitride obtained by this production method can have a long tool life when used as a tool, particularly when used in precision machining.

(10) The entry temperature is preferably 1200° C. or more. By setting to such an entry temperature, a tool using the obtained polycrystalline cubic boron nitride has an even better tool life.

(11) It is preferable to comprise a third step of, after the second step, holding the polycrystalline cubic boron nitride obtained in the second step for 10 minutes or more and 30 minutes or less under conditions of a temperature of 1500° C. or more and 2200° C. or less and a pressure of 10 GPa or more. By including this step, a tool using the obtained polycrystalline cubic boron nitride has an even better tool life.

(12) A method for manufacturing the polycrystalline cubic boron nitride of the present disclosure is a method for manufacturing the above-described polycrystalline cubic boron nitride, comprising:
a step A of preparing pyrolytic boron nitride; and
a step B of heating and pressurizing the pyrolytic boron nitride to a temperature and a pressure in a final sintering region, with the temperature and the pressure passing through a temperature and a pressure in a stable region of a wurtzite boron nitride to obtain the polycrystalline cubic boron nitride, wherein
the stable region of wurtzite boron nitride is, when the temperature is represented as T° C. and the pressure as P GPa, a region that simultaneously satisfies the following Formula 1 and Formula 2, $$P \geq -0.0037T + 11.301 \qquad \text{Formula 1:}$$

$$P \leq -0.085T + 117 \qquad \text{Formula 2:}$$

the final sintering region is, when the temperature is represented as T° C. and the pressure as P GPa, a region that simultaneously satisfies the following Formula 3, Formula 4, and Formula 5, $$P \geq 12 \qquad \text{Formula 3:}$$

$$P \geq -0.085T + 151 \qquad \text{Formula 4:}$$

$$P \leq -0.085T + 202 \qquad \text{Formula 5:}$$

and in the heating and pressurizing path of step B, an entry temperature into the stable region of wurtzite boron nitride is 900° C. or more.

The polycrystalline cubic boron nitride obtained by this production method can have a long tool life when used as a tool, particularly when used in precision machining.

(13) The entry temperature is preferably 1200° C. or more. By setting to such an entry temperature, a tool using the obtained polycrystalline cubic boron nitride has an even better tool life.

(14) It is preferable to comprise a step C of, after step B, holding the polycrystalline cubic boron nitride obtained in step B for 10 minutes or more and 30 minutes or less under conditions of a temperature and a pressure in the final sintering region. By including this step, a tool using the obtained polycrystalline cubic boron nitride has an even better tool life.

DETAILS OF EMBODIMENTS OF PRESENT DISCLOSURE

The polycrystalline cubic boron nitride of the present disclosure and a production method thereof will now be described with reference to the drawings.

First Embodiment: Polycrystalline Cubic Boron Nitride

A polycrystalline cubic boron nitride according to an embodiment of the present disclosure will now be described.

<Polycrystalline Cubic Boron Nitride>

The polycrystalline cubic boron nitride of the present disclosure is a polycrystalline cubic boron nitride including 96% by volume or more of cubic boron nitride, wherein the polycrystalline cubic boron nitride has a dislocation density of $8 \times 10^{15}/m^2$ or less, the polycrystalline cubic boron nitride includes a plurality of crystal grains, and the plurality of crystal grains have a median diameter d50 of an equivalent circle diameter of less than 100 nm.

The polycrystalline cubic boron nitride of the present disclosure is a sintered body, but since it is often intended that a sintered body include a binder, the term "polycrystalline body" is used in the present disclosure.

When used as a tool, the polycrystalline cubic boron nitride of the present disclosure can have a long tool life, particularly in precision machining. Although the reason for this is not clear, it is presumed to be as described in the following (i) to (iii).

(i) The polycrystalline cubic boron nitride of the present disclosure includes 96% by volume or more of cubic boron nitride, and has a very low content of components such as a binder, a sintering aid, and catalyst. Therefore, the cubic boron nitride grains are firmly bonded to each other, so that the strength and thermal diffusivity of the polycrystalline cubic boron nitride are improved. Therefore, a tool using the polycrystalline cubic boron nitride can have a long tool life even in precision machining.

(ii) In polycrystalline cubic boron nitride of the present disclosure, the dislocation density of the cubic boron nitride is $8 \times 10^{15}/m^2$ or less. Since the polycrystalline cubic boron nitride has few lattice defects in the polycrystalline body, the toughness of the polycrystalline cubic boron nitride is improved. Therefore, a tool using the polycrystalline cubic boron nitride has excellent damage resistance and crack propagation resistance, and can have a long tool life even in precision machining.

(iii) In the polycrystalline cubic boron nitride of the present disclosure, the median diameter d50 of an equivalent circle diameter of a plurality of crystal grains included therein is less than 100 nm. The polycrystalline cubic boron nitride has a higher strength as the grain size of the crystal grains is smaller. Therefore, a tool using the polycrystalline cubic boron nitride can have a long tool life even in precision machining.

In the above description, the polycrystalline cubic boron nitride of the present disclosure is described as having a long tool life in precision machining, but the machining method is not limited to this. Examples of the machining method include milling, turning, and the like. Further, examples of the work material include stainless tool steel and the like.

<Composition>

The polycrystalline cubic boron nitride of the present disclosure includes 96% by volume or more of cubic boron nitride. As a result, the polycrystalline cubic boron nitride has improved strength and thermal diffusivity, and excellent hardness, thermal stability, and chemical stability.

The polycrystalline cubic boron nitride can include, within a range in which the effects of the present disclosure are exhibited, in addition to cubic boron nitride, one, two, or all of hexagonal boron nitride, compressed hexagonal boron nitride, and wurtzite boron nitride. In this case, the total content of the hexagonal boron nitride, compressed hexagonal boron nitride, and wurtzite boron nitride in the polycrystalline cubic boron nitride can be 4% by volume or less. Here, the term "compressed hexagonal boron nitride" refers to a substance having a crystal structure similar to that of ordinary hexagonal boron nitride, in which the interplanar spacing in the c-axis direction is smaller than that of ordinary hexagonal boron nitride (0.333 nm).

The polycrystalline cubic boron nitride may include unavoidable impurities within a range in which the effects of the present disclosure are exhibited. Examples of unavoidable impurities include hydrogen, oxygen, carbon, alkali metal elements (in the present specification, the alkali metal elements include lithium (Li), sodium (Na), potassium (K)) and alkaline earth metal elements (in the present specification, the alkaline earth metal elements include calcium (Ca), magnesium (Mg), strontium (Sr), and barium (Ba)), silicon (Si), and aluminum (Al). When the polycrystalline cubic boron nitride includes unavoidable impurities, the content of the unavoidable impurities is preferably 0.1% by mass or less. The content of the unavoidable impurities can be measured by secondary ion mass spectrometry (SIMS).

The total content of alkali metal elements (lithium (Li), sodium (Na), potassium (K)) and alkaline earth metal elements (calcium (Ca), magnesium (Mg, strontium (Sr), and barium (Ba)) in the polycrystalline cubic boron nitride is preferably not more than 10 ppm. Among the above-described unavoidable impurities, the alkali metal elements and alkaline earth metal elements have a catalytic action on the phase conversion between hexagonal boron nitride and cubic boron nitride. When the total content of alkali metal elements and alkaline earth metal elements in the polycrystalline cubic boron nitride is 10 ppm or less, for a tool using the polycrystalline cubic boron nitride, even when the interface between the blade edge and the work material under the cutting environment is exposed to high temperature and high pressure, it is possible to better suppress the progress of damage to the tool due to conversion of a part of the cubic boron nitride constituting the tool into hexagonal boron nitride. The lower limit of the total content of alkali metal elements and the alkaline earth metal elements in the hexagonal boron nitride polycrystalline body is preferably 0 ppm. That is, the total content of alkali metal elements and alkaline earth metal elements in the hexagonal boron nitride polycrystalline body is preferably 0 ppm or more and 10 ppm or less.

A conventional cubic boron nitride sintered body is prepared by using, for example, as described in, Japanese Patent Laying-Open No. 2006-201216, cBN abrasive grains as a starting material. Here, the total content of the catalyst component (alkali metal elements and alkaline earth metal elements) remaining in the cBN abrasive grains (content of catalyst component in 1 mol of cBN) is $2.4 \times 10'$ to $13.5 \times 10^{-4}$ mol. Therefore, to a skilled person in the art, it is obvious that the total content of the catalyst component of a conventional polycrystalline cubic boron nitride obtained by sintering such cBN abrasive grains is 0.01% by mass (100 ppm) or more.

On the other hand, as described later, for the polycrystalline cubic boron nitride of the present disclosure, hexagonal boron nitride or pyrolytic boron nitride is used as the starting material, and the hexagonal boron nitride or pyrolytic boron nitride is converted into cubic boron nitride by heating and pressurizing, without using a catalyst. Therefore, the content of the catalyst component in the polycrystalline cubic boron nitride can be 10 ppm or less in terms of mass.

The total content of silicon (Si) and aluminum (Al) in the polycrystalline cubic boron nitride is preferably 50 ppm or less in terms of mass. By setting in this range, for a tool using the polycrystalline cubic boron nitride, even when the interface between the blade edge and the work material under the cutting environment is exposed to high temperature and high pressure, it is possible to better suppress the progress of damage to the tool due to a part of the cubic boron nitride constituting the tool reacting with Si or Al.

The polycrystalline cubic boron nitride preferably does not substantially include a binder, a sintering aid, a catalyst or the like. This improves the strength and thermal diffusivity of the polycrystalline cubic boron nitride.

The cubic boron nitride content in the polycrystalline cubic boron nitride is preferably 96% by volume or more and 100% by volume or less, more preferably 97% by volume or more and 100% by volume or less, and further preferably 98% by volume or more and 100% by volume or less. The upper limit of the cubic boron nitride content can be 100% by volume or less, 99.99% by volume or less, 99.9% by volume or less, 99.89% by volume or less, or 99.88% by volume or less.

The total content of hexagonal boron nitride, compressed hexagonal boron nitride, and wurtzite boron nitride in the polycrystalline cubic boron nitride is preferably 0% by volume or more and 4% by volume or less, preferably 0% by volume or more and 3% by volume or less, preferably 0% by volume or more and 2% by volume or less, and preferably 0% by volume. That is, it is preferable that the polycrystalline cubic boron nitride does not include any of hexagonal boron nitride, compressed hexagonal boron nitride, and wurtzite boron nitride.

The hexagonal boron nitride content in the polycrystalline cubic boron nitride is preferably 0% by volume or more and 4% by volume or less, preferably 0% by volume or more and 3% by volume or less, preferably 0% by volume or more and 2% by volume or less, and preferably 0% by volume. That is, it is preferable that the polycrystalline cubic boron nitride does not include hexagonal boron nitride.

The compressed hexagonal boron nitride content in the polycrystalline cubic boron nitride is preferably 0% by volume or more and 4% by volume or less, preferably 0% by volume or more and 3% by volume or less, preferably 0% by volume or more and 2% by volume or less, and preferably 0% by volume. That is, it is preferable that the polycrystalline cubic boron nitride does not include compressed hexagonal boron nitride.

The wurtzite boron nitride content in the polycrystalline cubic boron nitride is preferably 0% by volume or more and 4% by volume or less, preferably 0% by volume or more and 3% by volume or less, preferably 0% by volume or more and 2% by volume or less, and preferably 0% by volume. That is, it is preferable that the polycrystalline cubic boron nitride does not include wurtzite boron nitride.

Hexagonal boron nitride, compressed hexagonal boron nitride, and wurtzite boron nitride have low frictional resistance, and can reduce agglutination of the work material during cutting and reduce the cutting resistance. Further, hexagonal boron nitride, compressed hexagonal boron nitride, and wurtzite boron nitride are softer than cubic boron nitride and have excellent crack propagation resistance. Therefore, depending on the machining application, it may be preferable that the polycrystalline cubic boron nitride include hexagonal boron nitride, compressed hexagonal boron nitride and wurtzite boron nitride.

In the above case, it is preferable that the polycrystalline cubic boron nitride include 0.01% by volume or more of hexagonal boron nitride. The polycrystalline cubic boron nitride preferably includes 0.01% by volume or more and 4% by volume or less of hexagonal boron nitride, preferably includes 0.01% by volume or more and 3% by volume or less of hexagonal boron nitride, and preferably includes 0.01% by volume or more and 2% by volume or less of hexagonal boron nitride. In this case, it is preferable that the polycrystalline cubic boron nitride include 99.99% by volume or less of cubic boron nitride.

In the above case, it is preferable that the polycrystalline cubic boron nitride include 0.01% by volume or more of compressed hexagonal boron nitride. The polycrystalline cubic boron nitride preferably includes 0.01% by volume or more and 4% by volume or less of compressed hexagonal boron nitride, preferably includes 0.01% by volume or more and 3% by volume or less of compressed hexagonal boron nitride, and preferably includes 0.01% by volume or more and 2% by volume or less of compressed hexagonal boron nitride. In this case, it is preferable that the polycrystalline cubic boron nitride include 99.99% by volume or less of cubic boron nitride.

In the above case, it is preferable that the polycrystalline cubic boron nitride include 0.1% by volume or more of wurtzite boron nitride. The polycrystalline cubic boron nitride preferably includes 0.1% by volume or more and 4% by volume or less of wurtzite boron nitride, preferably includes 0.1% by volume or more and 3% by volume or less of wurtzite boron nitride, and preferably includes 0.1% by volume or more and 2% by volume or less of wurtzite boron nitride. In this case, it is preferable that the polycrystalline cubic boron nitride include 99.9% by volume or less of cubic boron nitride.

The content (% by volume) of the cubic boron nitride, hexagonal boron nitride, compressed hexagonal boron nitride, and wurtzite boron nitride in the polycrystalline cubic boron nitride can be measured by an X-ray diffraction method. The specific measurement method is as follows.

The polycrystalline cubic boron nitride is cut with a diamond grindstone-electrodeposited wire, and the cut surface is used as an observation surface.

Using an X-ray diffractometer ("MiniFlex 600" (trade name) manufactured by Rigaku), the X-ray spectrum of a cut surface of the polycrystalline cubic boron nitride is obtained. The conditions of the X-ray diffractometer at this time are as follows.

Characteristic X-ray: Cu-Kα (wavelength 1.54 Å)
Tube voltage: 45 kV
Tube current: 40 mA
Filter: Multi-layer mirror
Optical system: Focused method
X-ray diffraction method: θ-2θ method In the obtained X-ray spectrum, the following peak intensity A, peak intensity B, peak intensity C, and peak intensity D are measured.

Peak intensity A: Peak intensity of compressed hexagonal boron nitride excluding the background from the peak intensity near the diffraction angle 2θ=28.5°.

Peak intensity B: Peak intensity of wurtzite boron nitride excluding the background from the peak intensity near the diffraction angle 2θ=40.8°.

Peak intensity C: Peak intensity of cubic boron nitride excluding the background from the peak intensity near the diffraction angle 2θ=43.5°.

Peak intensity D: Peak intensity of hexagonal boron nitride excluding the background from the peak intensity near the diffraction angle 2θ=26.8°.

The compressed hexagonal boron nitride content is obtained by calculating the value of peak intensity A/(peak intensity A+peak intensity B+peak intensity C+peak intensity D). The wurtzite boron nitride content is obtained by calculating the value of peak intensity B/(peak intensity A+peak intensity B+peak intensity C+peak intensity D). The cubic boron nitride content is obtained by calculating the value of peak intensity C/(peak intensity A+peak intensity B+peak intensity C+peak intensity D). The hexagonal boron nitride content is obtained by calculating the value of peak intensity D/(peak intensity A+peak intensity B+peak intensity C+peak intensity D).

Since compressed hexagonal boron nitride, wurtzite boron nitride, cubic boron nitride, and hexagonal boron nitride all have similar electron density, the above-described X-ray peak intensity ratio can be taken as the volume ratio in the polycrystalline cubic boron nitride.

<Dislocation Density>

In the polycrystalline cubic boron nitride of the present disclosure, the dislocation density of the cubic boron nitride is $8 \times 10^{15}/m^2$ or less. Since the polycrystalline cubic boron nitride has few lattice defects in the polycrystalline body, the toughness of the polycrystalline cubic boron nitride is improved. Therefore, a tool using the polycrystalline cubic boron nitride has excellent damage resistance and crack propagation resistance, and can have a long tool life even in precision machining. The dislocation density is preferably $7 \times 10^{15}/m^2$ or less, and more preferably $6 \times 10^{15}/m^2$. Although the lower limit of the dislocation density is not particularly limited, from a production viewpoint, it can be set to $1 \times 10^{15}/m^2$ or less. That is, the dislocation density is preferably $1 \times 10^{15}/m^2$ or more and $8 \times 10^{15}/m^2$ or less, more preferably $1 \times 10^{15}/m^2$ or more and $7 \times 10^{15}/m^2$ or less, and further preferably $1 \times 10^{15}/m^2$ or more and $6 \times 10^{15}/m^2$ or less.

In the present specification, the dislocation density is calculated by the following procedure. A test piece composed of the polycrystalline cubic boron nitride is provided. In terms of size, the test piece has an observation surface of 2.0 mm×2.0 mm and a thickness of 1.0 mm. The observation surface of the test piece is polished.

X-ray diffraction measurement is performed on the observation surface of the test piece under the following conditions, and a line profile of a diffraction peak from each orientation plane of cubic boron nitride's major orientations which are (111), (200), (220), (311), (400) and (331) is obtained.

(X-Ray Diffraction Measurement Conditions)

X-ray source: synchrotron radiation Condition for equipment: detector NaI (fluorescence is cut by an appropriate ROI)
Energy: 18 keV (wavelength: 0.6888 Å)
Spectroscopic crystal: Si (111)
Entrance slit: width 5 mm×height 0.5 mm
Light receiving slit: double slit (width 3 mm×height 0.5 mm)
Mirror: platinum coated mirror
Incident angle: 2.5 mrad
Scanning method: 2θ-θ scan
Measurement peaks: six peaks from cubic boron nitride's (111), (200), (220), (311), (400), and (331). When it is difficult to obtain a profile depending on texture and orientation, the peak for that Miller index is excluded.

Measurement conditions: there are 9 or more measurement points set in the full width at half maximum. Peak top intensity is set to 2000 counts or more. Peak tail is also used in the analysis, and accordingly, the measurement range is set to about 10 times the full width at half maximum.

A line profile obtained from the above X-ray diffraction measurement will be a profile including both a true broadening attributed to a physical quantity such as the sample's inhomogeneous strain and a broadening attributed to the equipment. In order to determine inhomogeneous strain and crystallite size, a component attributed to the equipment is removed from the measured line profile to obtain a true line profile. The true line profile is obtained by fitting the obtained line profile and the line profile that is attributed to the equipment by a pseudo Voigt function, and subtracting the line profile attributed to the equipment. $LaB_6$ was used as a standard sample for removing a broadening of a diffracted peak attributed to the equipment. When significantly collimated radiation is used, a broadening of a diffracted peak attributed to the equipment may be regarded as zero.

The obtained true line profile is analyzed using the modified Williamson-Hall method and the modified Warren-Averbach method to calculate dislocation density. The modified Williamson-Hall method and the modified Warren-Averbach method are known line profile analysis methods used for determining dislocation density.

The modified Williamson-Hall method's expression is represented by the following expression (I):

[Expression 1]

[Expression 1]

$$\Delta K = \frac{0.9}{D} + \left(\frac{\pi M^2 b^2}{2}\right)^{1/2} \rho^{1/2} K C^{1/2} + O(K^2 C) \quad (I)$$

where ΔK represents a half width of a line profile, D represents a crystallite size, M represents a dislocation arrangement parameter, b represents a Burgers vector, ρ represents dislocation density, K represents a scattering vector, $O(K^2C)$ represents a higher-order term of $K^2C$, and C represents an average contrast factor.

C in the above expression (I) is represented by the following expression (II):

$$C = C_{h00}[1 - q(h^2k^2 + h^2l^2 + k^2l^2)/(h^2 + k^2 + l^2)^2]$$

In the above expression (II), a contrast factor $C_{h00}$ for screw dislocation and that for edge dislocation and a coefficient q for each contrast factor are obtained by using the computing code ANIZC, with a slip system of <110> {111}, and elastic stiffness $C_{11}$, $C_{12}$ and $C_{44}$ of 8.44 GPa, 1.9 GPa, and 4.83 GPa, respectively. Contrast factor $C_{h00}$ is 0.203 for screw dislocation and 0.212 for edge dislocation. The coefficient q for the contrast factor is 1.65 for screw dislocation and 0.58 for edge dislocation. Note that screw dislocation's ratio is fixed to 0.5 and edge dislocation's ratio is fixed to 0.5.

Furthermore, between dislocation and inhomogeneous strain, a relationship represented by an expression (III) is established using contrast factor C, as below:

$$<\varepsilon(L)^2>=(\rho Cb^2/4\pi)\ln(R_e/L) \qquad (III)$$

where $R_e$ represents dislocation's effective radius.

By the relationship of the above expression (III) and the Warren-Averbach expression, the following expression (IV) can be presented, and as the modified Warren-Averbach method, dislocation density p and a crystallite size can be determined.

$$\ln A(L) = \ln A^S(L) - (\pi L^2 \rho b^2/2)\ln(R_e/L)(K^2C) + O(K^2C)^2 \qquad (IV)$$

where A(L) represents a Fourier series, $A^S(L)$ represents a Fourier series for a crystallite size, and L represents a Fourier length.

For details of the modified Williamson-Hall method and the modified Warren-Averbach method, see T. Ungar and A. Borbely, "The effect of dislocation contrast on x-ray line broadening: A new approach to line profile analysis," Appl. Phys. Lett., vol. 69, no. 21, p. 31′73, 1996, and T. Ungar, S. Ott, P. Sanders, A. Borbely, J. Weertman, "Dislocations, grain size and planar faults in nanostructured copper determined by high resolution X-ray diffraction and a new procedure of peak profile analysis," Acta Mater., vol. 46, no. 10, pp. 3693-3699, 1998.

<Crystal Grains>
(Median Diameter d50)

The plurality of crystal grains included in the polycrystalline cubic boron nitride of the present disclosure have a median diameter d50 of an equivalent circle diameter (hereinafter, also referred to as "median diameter d50") of less than 100 nm. The polycrystalline cubic boron nitride has a higher strength as the grain size of the crystal grains is smaller. Therefore, a tool using the polycrystalline cubic boron nitride can have a long tool life even in precision machining.

The lower limit of the median diameter d50 of the crystal grains is not particularly limited, but from a production viewpoint, can be set to, for example, 10 nm.

(Measurement Method of Median Diameter d50)

In the present specification, the median diameter d50 of an equivalent circle diameter of the plurality of crystal grains included in the polycrystalline cubic boron nitride refers to a value obtained by measuring each median diameter d50 of the plurality of crystal grains at each of five arbitrarily selected measurement locations, and calculating the average value thereof.

It is noted that according to the measurements conducted by the applicant, as long as the median diameter d50 is measured for the same sample, there was almost no variation in the measurement result even when the calculation was conducted a plurality of times by changing the selected locations in the measurement visual field of the polycrystalline cubic boron nitride, from which it was confirmed that the median diameter d50 is not arbitrary even by randomly setting the measurement visual field.

When the cubic boron nitride crystalline body is used as a part of a tool, a portion of the polycrystalline cubic boron nitride is cut with a diamond grindstone-electrodeposited wire or the like, the cut cross-section is polished, and five measurement locations are arbitrarily set on the polished surface.

A method for measuring the median diameter d50 of a circle-equivalent diameter of a plurality of crystal grains at each measurement location will now be specifically described.

The polycrystalline cubic boron nitride is cut with a diamond grindstone-electrodeposited wire or the like so that the measurement locations are exposed, and the cut surface is polished. The measurement locations on the polished surface are observed using a SEM ("JSM-7500F" (trade name) manufactured by JEOL Ltd.) to obtain SEM images. The size of the measurement visual field is 12 μm×15 μm, and the observation magnification is 10,000 times.

For each of the five SEM images, in a state in which the grain boundaries of the crystal grains observed in the measurement visual field were isolated, the distribution of the equivalent circle diameter of each crystal grain was calculated using image processing software (Win Roof ver. 7.4.5).

The median diameter d50 is calculated with the entire measurement visual field as the denominator. The median diameter d50 is calculated from the distribution of the equivalent circle diameter of the crystal grains.

<Applications>

The polycrystalline cubic boron nitride of the present disclosure is suitable for use in a cutting tool, a wear resistant tool, a grinding tool, and the like.

A cutting tool, a wear resistant tool, and a grinding tool using the polycrystalline cubic boron nitride of the present disclosure may each be entirely composed of the polycrystalline cubic boron nitride, or only a part thereof (for example, in the case of a cutting tool, the blade edge portion) may be composed of the polycrystalline cubic boron nitride. Further, a coating film may be formed on the surface of each tool.

Examples of the cutting tool include a drill, an end mill, a blade edge exchangeable cutting tip for a drill, a blade edge exchangeable cutting tip for an end mill, a blade edge exchangeable cutting tip for milling, a blade edge exchangeable cutting tip for turning, a metal saw, a gear cutting tool, a reamer, a tap, a cutting bite, and the like.

Examples of the wear resistant tool include a die, a scriber, a scribing wheel, a dresser, and the like. Examples of the grinding tool include a grinding wheel.

Second Embodiment: Method for Manufacturing Polycrystalline Cubic Boron Nitride

Figure 2:
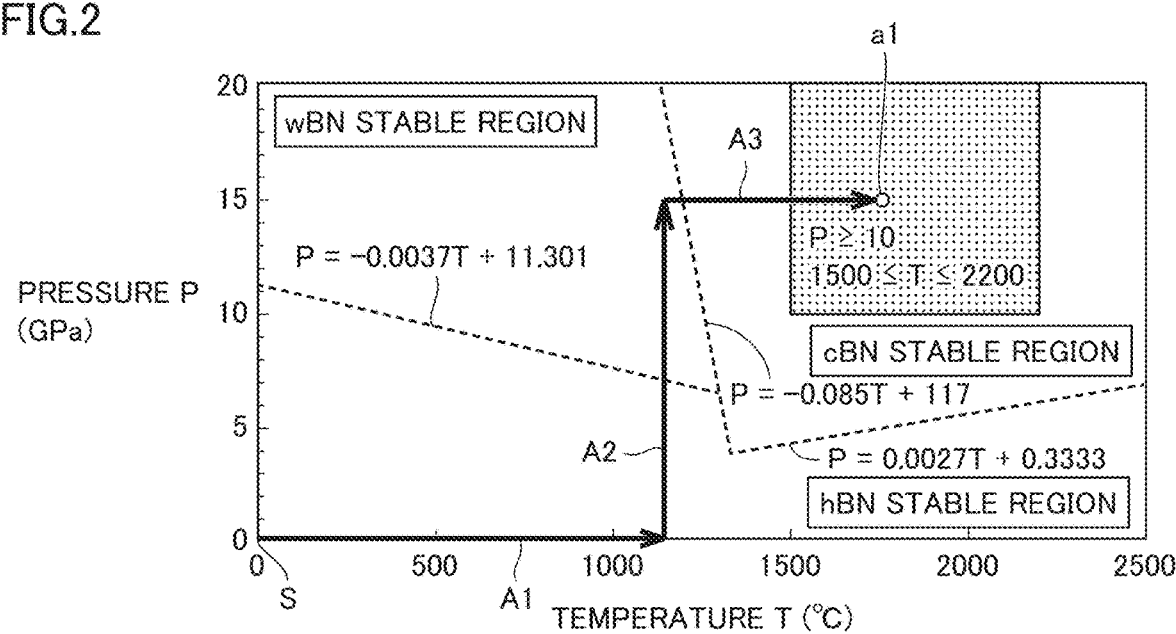
FIG. 2 is a diagram for showing an example of a method for manufacturing the polycrystalline cubic boron nitride according to the present disclosure.
Figure 3:
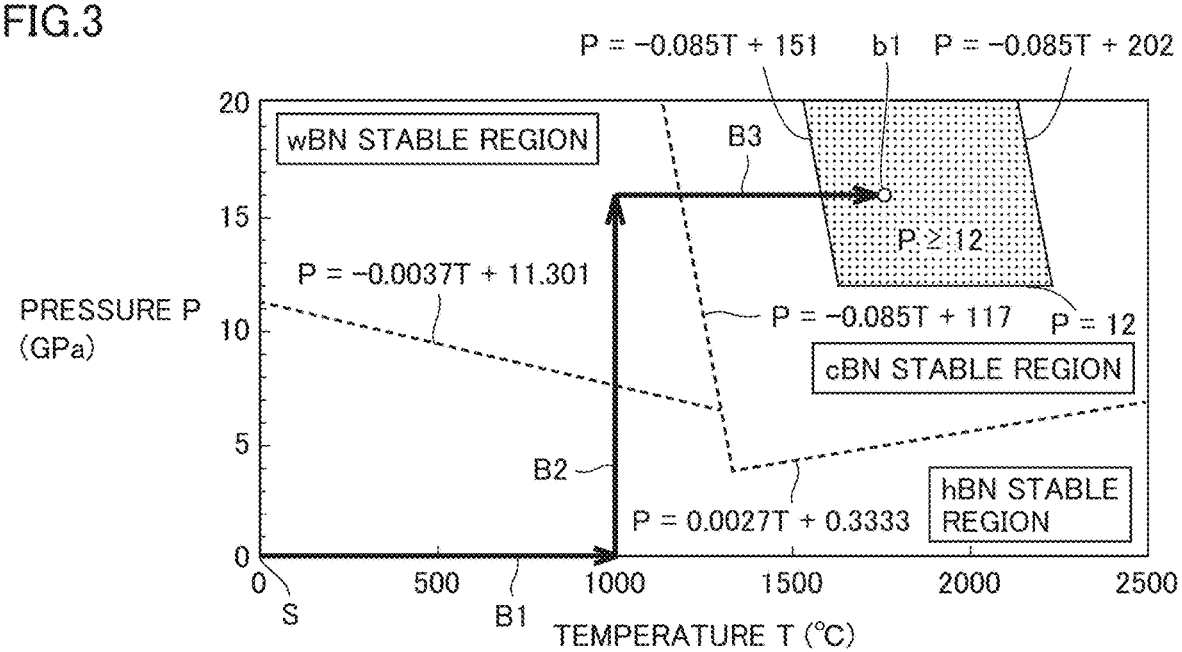
FIG. 3 is a diagram for showing another example of a method for manufacturing the polycrystalline cubic boron nitride according to the present disclosure.
Figure 4:
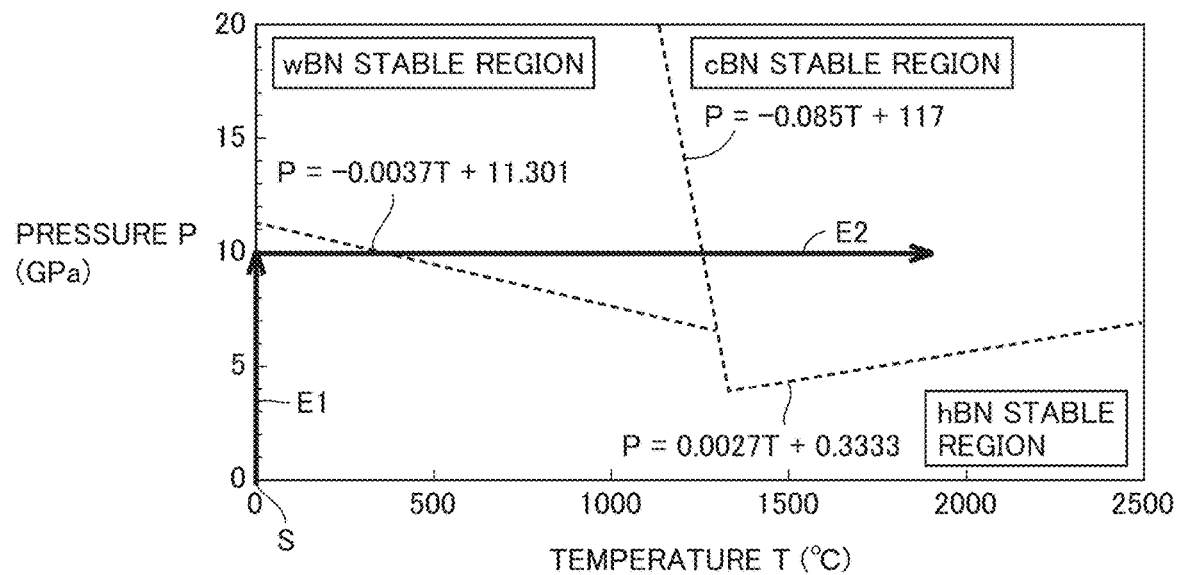
FIG. 4 is a diagram for showing a conventional example of a method for manufacturing a polycrystalline cubic boron nitride.
Figure 5:
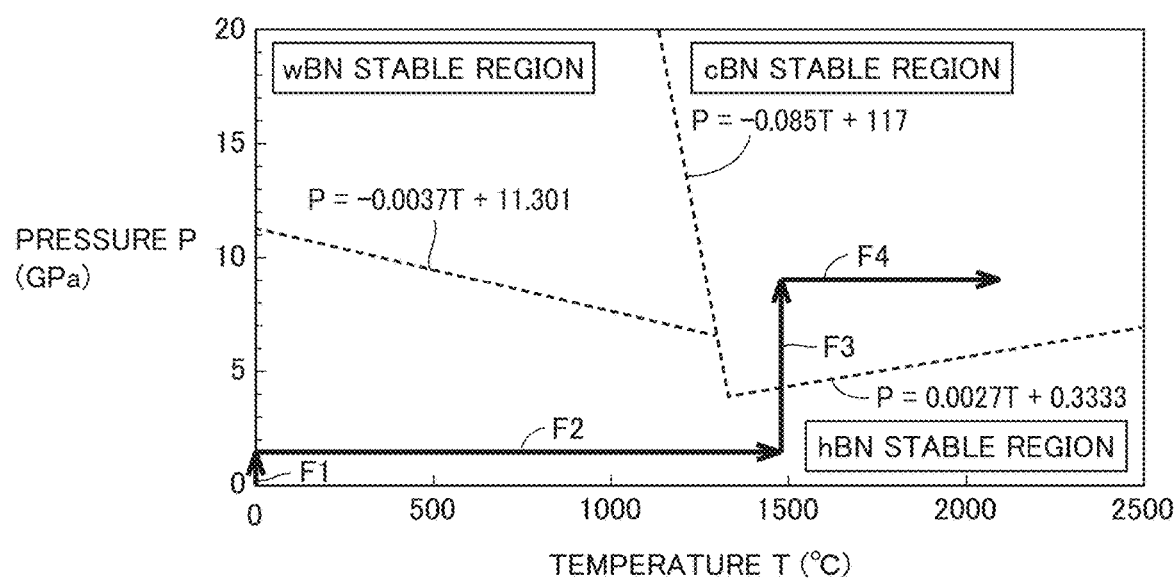
FIG. 5 is a diagram for showing a reference example of a method for manufacturing a polycrystalline cubic boron nitride.

A method for manufacturing the polycrystalline cubic boron nitride of the present disclosure will now be described with reference to FIGS. 1 to 5. FIG. 1 is a pressure-temperature phase diagram of boron nitride. FIGS. 2 and 3 are diagrams for showing methods for manufacturing the polycrystalline cubic boron nitride of the present disclosure. FIG. 4 is a diagram for showing a conventional example of a method for manufacturing a polycrystalline cubic boron nitride. FIG. 5 is a diagram for showing a reference example of a method for manufacturing a polycrystalline cubic boron nitride.

Before giving a detailed description of the method for manufacturing the polycrystalline cubic boron nitride of the present disclosure, in order to help understanding thereof, a pressure-temperature phase diagram of a polycrystalline cubic boron nitride, and a conventional example and a reference example of a method for manufacturing a polycrystalline cubic boron nitride will be described.

<Pressure-Temperature Phase Diagram>

As shown in FIG. 1, boron nitride includes three phases, namely, hexagonal boron nitride, which is a stable phase at ordinary temperature and ordinary pressure, cubic boron nitride, which is a stable phase at high temperature and high pressure, and wurtzite boron nitride, which is a metastable phase during the transition from hexagonal boron nitride to cubic boron nitride.

The boundary of each phase can be represented by a linear function. In this specification, the temperature and pressure in the stable region of each phase can be shown using a linear function.

In the present specification, the temperature and pressure in the stable region of wurtzite boron nitride (in FIG. 1, indicated as "wBN stable region") are defined as, when the temperature is represented as T (° C.) and the pressure as P (GPa), a temperature and a pressure that simultaneously satisfy the following Formula 1 and Formula 2.

$$P \geq -0.0037T + 11.301 \quad \text{Formula 1:}$$

$$P \leq -0.085T + 117 \quad \text{Formula 2:}$$

In the present specification, the temperature and pressure in the stable region of hexagonal boron nitride (in FIG. 1, indicated as "hBN stable region") are defined as, when the temperature is represented as T° C. and the pressure as P (GPa), a temperature and a pressure that simultaneously satisfy the following Formula A and Formula B or a temperature and a pressure that simultaneously satisfy the following Formula C and Formula D.

$$P \leq -0.0037T + 11.301 \quad \text{Formula A}$$

$$P \leq -0.085T + 117 \quad \text{Formula B}$$

$$P \leq -0.0027T + 0.3333 \quad \text{Formula C}$$

$$P \geq -0.085T + 117 \quad \text{Formula D}$$

In the present specification, the temperature and pressure in the stable region of cubic boron nitride (in FIG. 1, indicated as "cBN stable region") are defined as, when the temperature is represented as T (° C.) and the pressure as P (GPa), a temperature and a pressure that simultaneously satisfy the following Formula D and Formula E.

$$P \geq -0.085T + 117 \quad \text{Formula D}$$

$$P \geq -0.0027T + 0.3333 \quad \text{Formula E}$$

In the production method according to the present embodiment, a hexagonal boron nitride powder is heated and pressurized to a temperature of 1900° C. or more and 2400° C. or less and a pressure of 8 GPa or more. This temperature and pressure are a temperature and a pressure at which cubic boron nitride having excellent tool performance is obtained.

<Conventional Example of Production Method of Cubic Boron Nitride Composite Body>

Conventionally, the path shown in FIG. 4 (hereinafter, also referred to as "path of FIG. 4") was studied as the heating and pressurizing path for hexagonal boron nitride to attain a temperature and a pressure within the stable region of cubic boron nitride.

In the path of FIG. 4, when heating and pressurizing from the temperature and pressure at the starting point S (ordinary temperature and ordinary pressure) to the temperature and pressure in the stable region of cubic boron nitride (hereinafter, also referred to as "target temperature" and "target pressure", respectively), first, the pressure is increased to the target pressure (in FIG. 4, about 10 GPa) (arrow E1 in FIG. 4), and then the temperature is raised to the target temperature (in FIG. 4, about 1900° C.) (arrow E2 in FIG. 4). In the path of FIG. 4, heating and pressurization are each performed once, and therefore control of the heating and pressurizing operation is simple, and has been conventionally adopted.

However, in the path of FIG. 4, since the entry temperature into the stable region of wurtzite boron nitride is about 351° C., which is low, atomic diffusion does not easily occur, and the phase transition from hexagonal boron nitride to wurtzite boron nitride is mainly non-diffusion type phase transition. Therefore, the obtained polycrystalline cubic boron nitride tends to have lattice defects and coarse grains. As a result, this cubic boron nitride tends to become suddenly damaged during machining, and the tool life tends to shorten.

<Reference Example of Polycrystalline Cubic Boron Nitride>

On the other hand, one way to facilitate atomic diffusion is to increase the phase transition temperature. For example, in the path of FIG. 5, to prevent the temperature and pressure from going past the stable region of wurtzite boron nitride, heating and pressurizing (arrows F1, F2, F3 in FIG. 5) is carried out from a start temperature and a start pressure (an ordinary temperature and an ordinary pressure) to a temperature (in FIG. 5, about 1500° C.) and a pressure (in FIG. 5, about 9 GPa) in the stable region of cubic boron nitride, and then the temperature is further increased (in FIG. 5, to about 2100° C.) (arrow F4 in FIG. 5).

In the path of FIG. 5, hexagonal boron nitride undergoes direct phase transition to cubic boron nitride, but since hexagonal boron nitride and cubic boron nitride have significantly different crystal structures, lattice defects tend to occur during phase transition. Therefore, this cubic boron nitride tends to have a short tool life. Further, since the crystal structures of hexagonal boron nitride and cubic boron nitride differ significantly, the conversion rate to cubic boron nitride decreases. Therefore, the performance of a tool using the obtained polycrystalline cubic boron nitride deteriorates.

As described above, with the heating and pressurizing path that has been conventionally studied, it is difficult to suppress the occurrence of lattice defects, and it is not possible to manufacture a polycrystalline cubic boron nitride having an excellent tool life. In view of this situation, the present inventors have intensively studied pressure and temperature paths. As a result, the present inventors discovered a heating and pressurizing path capable of obtaining a polycrystalline cubic boron nitride that can have a long tool life even in precision machining.

In the conventional method for manufacturing a cBN sintered body, a cBN powder is used as a starting material, the cBN powder is pressurized and then heated to perform sintering. It is inferred that the pressurization causes the grains of the cBN powder, which have a high hardness, to come into contact with each other, whereby dislocations are introduced into the cBN particles. However, as in the production method of the polycrystalline cubic boron nitride of the present disclosure, when a low hardness hBN powder or pyrolytic boron nitride is used as the starting material, and the heating and pressurizing treatment are carried out on such an hBN powder or pyrolytic boron nitride and converted into a polycrystalline cubic boron nitride, it is impossible to predict the dislocation density of the polycrystalline cubic boron nitride. As a result of intensive studies, the present inventors have newly discovered a relationship between the heating and pressurizing conditions and the dislocation density and tool performance of the polycrystalline cubic boron nitride.

The details of the method for manufacturing the polycrystalline cubic boron nitride of the present disclosure will now be described below.

<Method (1) for Manufacturing Polycrystalline Cubic Boron Nitride>

A method (1) for manufacturing the polycrystalline cubic boron nitride of the present disclosure is a method for manufacturing the polycrystalline cubic boron nitride of the first embodiment. The method (1) for manufacturing the polycrystalline cubic boron nitride of the present disclosure comprises a first step of preparing a hexagonal boron nitride powder having a median diameter d90 of an equivalent circle diameter of 0.3 μm or less (hereinafter, also referred to as "first step"), and a second step of heating and pressurizing the hexagonal boron nitride powder to a temperature greater than or equal to 1500° C. and less than or equal to 2200° C. and to a pressure greater than or equal to 10 GPa, with the temperature and the pressure passing through a temperature and a pressure in a stable region of a wurtzite boron nitride to obtain the polycrystalline cubic boron nitride (hereinafter, also referred to as "second step"). In this method, the stable region of wurtzite boron nitride is, when the temperature is represented as T° C. and the pressure as P GPa, a region that simultaneously satisfies the following Formula 1 and Formula 2, $$P \geq -0.0037T + 11.301 \quad \text{Formula 1:}$$

$$P \leq -0.085T + 117 \quad \text{Formula 2:}$$

and in the heating and pressurizing path of the second step, an entry temperature into the stable region of wurtzite boron nitride is 900° C. or more.

The polycrystalline cubic boron nitride of the first embodiment can be manufactured by the above-described production method. That is, the polycrystalline cubic boron nitride obtained by this production method includes 96% by volume or more of cubic boron nitride, the cubic boron nitride constituting the polycrystalline body has a fine grain size (that is, an average grain size of less than 100 nm), and the dislocation density of cubic boron nitride is small (that is, $8 \times 10^{15}/m^2$ or less).

The method (1) for manufacturing the polycrystalline cubic boron nitride of the present disclosure can also comprise a third step of, after the second step, holding the polycrystalline cubic boron nitride obtained in the second step for 10 minutes or more and 30 minutes or less under conditions of a temperature of 1500° C. or more and 2200° C. or less and a pressure of 10 GPa or more (hereinafter, also referred to as "third step").

Details of each step of the method (1) for manufacturing the polycrystalline cubic boron nitride of the present disclosure will now be described below with reference to FIG. 2. In FIG. 2, the arrows indicate the heating and pressurizing path. Further, a circle at the tip of an arrow indicates that the temperature and pressure are held for a certain period of time. Further, the heating and pressurizing path shown in FIG. 2 is an example, and the present invention is not limited to this.

(First Step)

A hexagonal boron nitride powder having a median diameter d90 of an equivalent circle diameter (hereinafter, also referred to as "median diameter d90") of 0.3 μm or less is prepared as a raw material for the polycrystalline cubic boron nitride.

As the hexagonal boron nitride powder, a powder having a median diameter d90 (0.3 μm or less) that is slightly larger than the median diameter d50 (less than 100 nm) of the crystal grains included in the obtained cubic boron nitride crystalline body is used. This is because during the transition from hexagonal boron nitride to cubic boron nitride, the bonds between the hBNs break and the atoms recombine and form new bonds, which results in the cubic boron nitride having a small grain size than the grain size of the raw material. The smaller the grain size of the raw material is, the larger the number of grain boundaries where there is no original hBN-hBN bond, and therefore the grain size of the cubic boron nitride after conversion becomes smaller. Conversely, the larger the grain size of the raw material, the larger the particle size of the cubic boron nitride after conversion.

The hexagonal boron nitride powder has a median diameter d90 of 0.3 μm or less, and preferably 0.2 μm or less. The lower limit of the median diameter d90 of the hexagonal boron nitride powder is not particularly limited, but from a production viewpoint, it may be 0.05 μm. The hexagonal boron nitride powder has a median diameter d90 of an equivalent circle diameter of preferably 0.05 μm or more and 0.3 μm or less, and more preferably 0.05 μm or more and 0.2 μm or less.

As the hexagonal boron nitride powder, a hexagonal boron nitride powder manufactured by a conventionally known synthesis method and a commercially available hexagonal boron nitride powder can both be used.

The hexagonal boron nitride powder has a purity (hexagonal boron nitride content) of preferably 98.5% or more, more preferably 99% or more, and most preferably 100%.

(Second Step)

Next, for example, from an ordinary temperature and an ordinary pressure (temperature and pressure indicated by S in FIG. 2), the hexagonal boron nitride powder is heated and pressured to a temperature greater than or equal to 1500° C. and less than or equal to 2200° C. (hereinafter also referred to as "attainment temperature") and to a pressure greater than or equal to 10 GPa (hereinafter also referred to as "attainment pressure"), with the temperature and the pressure passing through a temperature and a pressure in a stable region of a wurtzite boron nitride to obtain a polycrystalline cubic boron nitride (arrows A1, A2, and A3). In the heating and pressurizing path of the second step, the entry temperature into the stable region of wurtzite boron nitride is 900° C. or more.

In the present specification, the expression "entry temperature into the stable region of wurtzite boron nitride" means the temperature at which the boron nitride first attains the stable region of wurtzite boron nitride in the heating and pressurizing path of the second step. In FIG. 2, this entry temperature is the temperature (about 1150° C.) at the intersection of the arrow A2 and the line P=−0.0037T+ 11.301.

In the heating and pressurizing path of the second step, the entry temperature into the stable region of wurtzite boron nitride is 900° C. or more. As a result, the hexagonal boron nitride powder is converted into wurtzite boron nitride in an environment where atomic diffusion tends to occur, and is then converted into cubic boron nitride. Therefore, in the obtained polycrystalline cubic boron nitride, there are fewer lattice defects and the strength of the polycrystalline cubic boron nitride is improved. Accordingly, a tool using the polycrystalline cubic boron nitride can have a long tool life even in precision machining.

The entry temperature into the stable region of wurtzite boron nitride is preferably 1000° C. or more, and more preferably 1200° C. or more. The higher the entry temperature, the more easily atomic diffusion occurs, and lattice defects tend to decrease. The upper limit of the entry temperature may be 1250° C., for example. The entry temperature into the stable region of wurtzite boron nitride is preferably 900° C. or more and 1250° C. or less, more preferably 1000° C. or more and 1250° C. or less, and further preferably 1200° C. or more and 1250° C. or less.

The attainment pressure in the second step is 10 GPa or more. The upper limit of the attainment pressure is not particularly limited, but may be 20 GPa, for example.

In the second step, the holding time at the temperature and pressure in the stable region of wurtzite boron nitride can be, for example, 5 minutes or more and 60 minutes or less.

In the second step, in the path of FIG. 2, heating is carried out, then pressurizing is carried out, and then heating is further carried out, but the present invention is not limited to this. The heating and pressurizing path can be any path in which the entry temperature into the stable region of wurtzite boron nitride can be 900° C. or more, the attainment temperature can be 1500° C. or more and 2200° C. or less, and the attainment pressure can be 10 GPa or more.

As described above, the polycrystalline cubic boron nitride can be obtained by performing the second step on a hexagonal boron nitride powder.

(Third Step)

After the second step, a step of holding the polycrystalline cubic boron nitride obtained in the second step for 10 minutes or more and 30 minutes or less under conditions of a temperature of 1500° C. or more and 2200° C. or less (hereinafter, also referred to as "final sintering temperature") and a pressure of 10 GPa or more (hereinafter, also referred to as "final sintering pressure") can be performed. As a result of this step, the obtained polycrystalline cubic boron nitride has an increased cubic boron nitride content and can achieve an even longer tool life.

The final sintering temperature is preferably 1500° C. or more and 2000° C. or less, and more preferably 1500° C. or more and 1800° C. or less. The final sintering pressure is preferably 10 GPa or more and 20 GPa or less, and more preferably 10 GPa or more and 15 GPa or less. The sintering time in the third step is preferably 10 minutes or more and 30 minutes or less, and more preferably 10 minutes or more and 15 minutes or less.

<Method (2) for Manufacturing Polycrystalline Cubic Boron Nitride>

A method (2) for manufacturing the polycrystalline cubic boron nitride of the present disclosure is a method for manufacturing the polycrystalline cubic boron nitride of the first embodiment. The method (2) for manufacturing the polycrystalline cubic boron nitride of the present disclosure comprises a step A of preparing pyrolytic boron nitride (hereinafter, also referred to as "step A"), and a step B of heating and pressurizing the pyrolytic boron nitride to a temperature and a pressure in a final sintering region, with the temperature and the pressure passing through a temperature and a pressure in a stable region of a wurtzite boron nitride to obtain the polycrystalline cubic boron nitride (hereinafter, also referred to "step B"). In this method, the stable region of wurtzite boron nitride is, when the temperature is represented as T (° C.) and the pressure as P (GPa), a region that simultaneously satisfies the following Formula 1 and Formula 2, $P \geq -0.0037T+11.301$      Formula 1:

$P \leq -0.085T+117$      Formula 2:

the final sintering region is, when the temperature is represented as T (° C.) and the pressure as P (GPa), a region that simultaneously satisfies the following Formula 3, Formula 4, and Formula 5, $P \geq 12$      Formula 3:

$P \geq -0.085T+151$      Formula 4:

$P \leq -0.085T+202$      Formula 5:

and in the heating and pressurizing path of step B, an entry temperature into the stable region of wurtzite boron nitride is 900° C. or more.

It should be noted that Formula 2, Formula 4, and Formula 5 exhibit the following relationship. In Formula 2, taking that the temperature when the pressure is P1 (GPa) to be T1 (° C.), in this case, in Formula 4, the temperature when the pressure is P1 (GPa) will be T1+400 (° C.). Further, in Formula 5, the temperature when the pressure is P1 (GPa) will be T1+1000 (° C.). That is, when the temperature is increased while keeping the pressure constant, the temperature that satisfies Formula 4 is 400° C. higher than the temperature that satisfies Formula 2, and the temperature that satisfies Formula 5 is 1000° C. higher than the temperature that satisfies Formula 2.

The polycrystalline cubic boron nitride of the first embodiment can be manufactured by the above-described production method. That is, the polycrystalline cubic boron nitride obtained by this production method includes 96% by volume or more of cubic boron nitride, the cubic boron nitride constituting the polycrystalline body has a fine grain size (that is, an average grain size of less than 100 nm), and the dislocation density of cubic boron nitride is small (that is, $8 \times 10^{15}/m^2$ or less).

The method (2) for manufacturing the polycrystalline cubic boron nitride of the present disclosure can also comprise a step C of, after step B, holding the polycrystalline cubic boron nitride obtained in step B for 10 minutes or more and 30 minutes or less under conditions of a temperature and a pressure in a final sintering region (hereinafter, also referred to as "step C").

Details of each step of the method (2) for manufacturing the polycrystalline cubic boron nitride of the present disclosure will now be described below with reference to FIG. 3. In FIG. 3, the arrows indicate the heating and pressurizing path. Further, a circle at the tip of an arrow indicates that the temperature and pressure are held for a certain period of time. Further, the heating and pressurizing path shown in FIG. 3 is an example, and the present invention is not limited to this.

(Step A)

Pyrolytic boron nitride is prepared as the raw material of the polycrystalline cubic boron nitride. Pyrolytic boron nitride has a very fine grain size due to thermal decomposition, and it is thought that even if the final sintering temperature is set relatively high to reduce the dislocation density of the cubic boron nitride, fine crystal grains can be maintained. As the pyrolytic boron nitride, pyrolytic boron nitride manufactured by a conventionally known synthesis method and commercially available pyrolytic boron nitride can both be used.

(Step B)

Next, for example, from an ordinary temperature and an ordinary pressure (temperature and pressure indicated by S in FIG. 3), the pyrolytic boron nitride powder is heated and pressured to a temperature and a pressure in a final sintering region, with the temperature and the pressure passing through a temperature and a pressure in a stable region of a wurtzite boron nitride (→B1, B2, and B3). In the heating and pressurizing path of the step B, the entry temperature into the stable region of wurtzite boron nitride is 900° C. or more. In FIG. 3, the entry temperature into the stable region of wurtzite boron nitride is the temperature (about 1000° C.) at the intersection of the arrow B2 and the line P=−0.0037T+11.301.

In step B, the entry temperature into the stable region of wurtzite boron nitride is 900° C. or more. As a result, the hexagonal boron nitride powder is converted into wurtzite boron nitride in an environment where atomic diffusion tends to occur, and is then converted into cubic boron nitride. Therefore, in the obtained polycrystalline cubic boron nitride, there are fewer lattice defects and the strength of the polycrystalline cubic boron nitride is improved. Accordingly, a tool using the polycrystalline cubic boron nitride can have a long tool life even in precision machining.

The entry temperature into the stable region of wurtzite boron nitride is preferably 1000° C. or more, and more preferably 1200° C. or more. The higher the entry temperature, the more easily atomic diffusion occurs, and lattice defects tend to decrease. The upper limit of the entry temperature may be 1250° C., for example. The entry temperature into the stable region of wurtzite boron nitride is preferably 900° C. or more and 1250° C. or less, more preferably 1000° C. or more and 1250° C. or less, and further preferably 1200° C. or more and 1250° C. or less.

The temperature and the pressure attained in step B simultaneously satisfy Formula 2, Formula 3, and Formula 4 By heating and pressurizing pyrolytic boron nitride to a temperature and a pressure in the final sintering region that simultaneously satisfy Formula 2, Formula 3, and Formula 4, the obtained polycrystalline cubic boron nitride has an increased cubic boron nitride content, a lower dislocation density of cubic boron nitride, and a smaller median diameter d50 of the crystal grains, and an even longer tool life can be achieved.

The pressure attained in step B is represented by Formula 3 (P≥12). That is, the attained pressure is 12 GPa or more. The upper limit of this pressure is not particularly limited, but can be 20 GPa, for example.

In step B, the holding time at the temperature and pressure in the stable region of wurtzite boron nitride can be, for example, 5 minutes or more and 60 minutes or less.

In step B, in the path of FIG. 3, heating is carried out, then pressurizing is carried out, and then heating is further carried out, but the present invention is not limited to this. The heating and pressurizing method can be any path in which the entry temperature into the stable region of wurtzite boron nitride can be 900° C. or more, and the temperature and pressure can be increased to a temperature and a pressure in the final sintering region.

As described above, the polycrystalline cubic boron nitride can be obtained by performing step B on a hexagonal boron nitride powder.

(Step C)

After the above-described step B, a step of holding the polycrystalline cubic boron nitride obtained in step B for 10 minutes or more and 30 minutes or less under conditions of a temperature and a pressure in the final sintering region can be included. As a result of this step, the obtained polycrystalline cubic boron nitride has an increased cubic boron nitride content and can achieve an even longer tool life.

EXAMPLES

The embodiments will now be described more specifically by way of Examples. However, the present invention is not limited to these Examples.

Example 1

In Example 1, the relationship among the production conditions of the above-described method (1) for manufacturing a polycrystalline cubic boron nitride, the structure (composition, median diameter of crystal grains, and dislocation density) of the obtained polycrystalline cubic boron nitride, and tool life when performing precision machining with a tool using the polycrystalline cubic boron nitride was investigated.

<Production of Polycrystalline Cubic Boron Nitride>

The cubic boron nitride polycrystalline bodies of Sample 1 to Sample 11 were manufactured according to the following procedure.

(First Step)

Six grams of a hexagonal boron nitride powder (median diameter d90: 0.3 μm) was prepared. The hexagonal boron nitride powder was placed into a molybdenum capsule and arranged in an ultrahigh pressure and high temperature generator.

(Second Step and Third Step)

[Sample 1 to Sample 4 and Sample 6 to Sample 11]

Using the above-described hexagonal boron nitride powder and ultrahigh pressure and high temperature generator, while maintaining the pressure at the pressure shown in the "pressure" column of the "starting point" in Table 1, the temperature was increased from the temperature shown in the "temperature" column of the "starting point" to the "attainment temperature" column of the "first stage".

Then, while maintaining the temperature, the pressure was increased to the pressure shown in the "attainment pressure" column of the "second stage" in Table 1

Then, while maintaining the pressure, the temperature was increased to the temperature shown in the "attainment temperature" column of the "third stage" in Table 1 and held for 15 minutes, whereby polycrystalline cubic boron nitride was obtained. In Sample 1 to Sample 4 and Sample 6 to Sample 11, the high temperature/high pressure treatment for 15 minutes at the "attainment temperature" and "attainment pressure" shown in the "third stage" corresponds to the third step.

[Sample 5]

Using the above-described hexagonal boron nitride powder and ultrahigh pressure and high temperature generator, while maintaining the temperature at the temperature shown in the "temperature" column of the "starting point" in Table 1, the pressure was increased from the pressure shown in the "pressure" column of the "starting point" to the "attainment pressure" column of the "first stage".

Then, while maintaining the pressure, the temperature was increased to the temperature shown in the "attainment temperature" column of the "second stage" in Table 1 and held for 15 minutes, whereby polycrystalline cubic boron nitride was obtained. In Sample 5, the high temperature/high pressure treatment for 15 minutes at the "attainment temperature" and "attainment pressure" shown in the "second stage" corresponds to the third step.

<Evaluation>
(Measurement of Composition)

The content of the cubic boron nitride in the obtained cubic boron nitride polycrystalline bodies was measured by X-ray diffraction. Since the specific X-ray diffraction method is as shown in the first embodiment, a description thereof will not be repeated here. The results are shown in the "cBN content" column of Table 1.

In all the samples, components other than cubic boron nitride, hexagonal boron nitride, compressed hexagonal boron nitride, and wurtzite boron nitride were not identified.

(Measurement of Dislocation Density)

The dislocation density of the cubic boron nitride in the obtained cubic boron nitride polycrystalline bodies was calculated by using the modified Williamson-Hall method and the modified Warren-Averbach method to analyze the line profile obtained by X-ray diffraction measurement. The specific method for calculating the dislocation density is as described in the first embodiment, and therefore a description thereof will not be repeated here. The results are shown in the "Dislocation density" column of Table 1.

(Measurement of Median Diameter d50 of Crystal Grains)

The median diameter d50 of an equivalent circle diameter was measured for the crystal grains included in the obtained cubic boron nitride polycrystalline bodies. Since the specific method is as shown in the first embodiment, a description thereof will not be repeated here. The results are shown in the "Median diameter (d50)" column of Table 1.

(Cutting Test)

The obtained cubic boron nitride polycrystalline bodies were cut with a laser and finished to manufacture a ball end mill. Using this ball end mill, spherical machining of ELMAX Steel® (manufactured by Uddeholm, chrome-vanadium-molybdenum alloy steel) was performed under the following cutting conditions to evaluate tool performance.

(Cutting Conditions)
Work material: ELMAX Steel® (manufactured by Uddeholm, chrome-vanadium-molybdenum alloy steel)
Tool shape: Ball end mill, R 0.6 mm per blade
Rotation speed: 38000 rpm
Feed: 1000 mm/min
Depth of cut (ap): 0.005 mm
Cutting width (ae): 0.005 mm
With oil mist
Machined into a ϕ12 hemispherical shape These cutting conditions correspond to precision machining.

(Tool Performance Evaluation)

The work material was cut under the cutting conditions described above, and the number of dimples having a ϕ12 hemispherical shape until the surface roughness Ra of the machined surface of the work material exceeded 0.2 μm was measured. A larger number of dimples indicates better damage resistance and a longer tool life. The specific method for measuring the surface roughness Ra of the machined surface is as follows.

First, the hemispherical shape obtained by machining is observed from above. At this time, the hemispherical shape is observed as a circle. A measurement visual field of 0.530 mm×0.0706 mm is set so as to include a position that is ⅓ of the radius away from the center of the circle in the radial direction.

The measurement visual field was measured using a scanning white interferometer ("NewView"®, manufactured by Zygo Corporation), the surface shape data was entered, and Ra was calculated in the range of 0.05 mm in the pick feed direction.

The results are shown in the "number of dimples" column of Table 1.

TABLE 1

| | | | Heating and pressurizing path | | | | | | | Polycrystalline cubic boron nitride | | | Evaluation |
|---|---|---|---|---|---|---|---|---|---|---|---|---|---|
| | Starting point | | First stage | | Second stage | | Third stage | | | | | | |
| | | | Attainment | Attainment | Attainment | Attainment | Attainment | Attainment | wBN Stable | cBN | Median | Dislo- | Number |
| Sample No. | Temperature (° C.) | Pressure (GPa) | temperature (° C.) | pressure (GPa) | temperature (° C.) | pressure (GPa) | temperature (° C.) | pressure (GPa) | region entry temperature (° C.) | content (% by volume) | diameter (d50) (nm) | cation density (×10$^{15}$/m$^2$) | of dimples (number) |
| 1 | 25 | 0 | 1210 | 0 | 1210 | 14 | 1750 | 14 | 1210 | 98.1 | 80 | 6.7 | 28 |
| 2 | 25 | 0 | 1100 | 0 | 1100 | 14 | 1750 | 14 | 1100 | 98.2 | 78 | 7.1 | 24 |
| 3 | 25 | 0 | 950 | 0 | 950 | 14 | 1750 | 14 | 950 | 97.5 | 81 | 7.8 | 23 |
| 4 | 25 | 0 | 850 | 0 | 850 | 14 | 1750 | 14 | 850 | 97.6 | 80 | 8.2 | 11 |
| 5 | 25 | 0 | 25 | 14 | 1750 | 14 | — | — | 25 | 97.5 | 80 | 9.4 | 3 |
| 6 | 25 | 0 | 1000 | 0 | 1000 | 14 | 1450 | 14 | 1000 | 95.5 | 70 | 7.6 | 9 |
| 7 | 25 | 0 | 1000 | 0 | 1000 | 14 | 1550 | 14 | 1000 | 96.2 | 73 | 7.7 | 24 |
| 8 | 25 | 0 | 1000 | 0 | 1000 | 14 | 1950 | 14 | 1000 | 96.9 | 96 | 7.7 | 25 |
| 9 | 25 | 0 | 1000 | 0 | 1000 | 14 | 2050 | 14 | 1000 | 98.0 | 99 | 7.7 | 17 |
| 10 | 25 | 0 | 950 | 0 | 950 | 11 | 1750 | 11 | 950 | 96.3 | 80 | 7.8 | 18 |
| 11 | 25 | 0 | 950 | 0 | 950 | 9 | 1750 | 9 | 950 | 95.7 | 78 | 7.7 | 8 |

<Consideration>

[Sample 1 to Sample 3, Sample 7, Sample 8, Sample 9, and Sample 10]

The production method of each of Sample 1 to Sample 3, Sample 7, Sample 8, Sample 9, and Sample 10 corresponded to the Example. The cubic boron nitride polycrystalline bodies of Sample 1 to Sample 3, Sample 7, Sample 8, Sample 9, and Sample 10 all included 96% by volume or more of cubic boron nitride, had a cubic boron nitride dislocation density of $8 \times 10^{15}$/m$^2$ or less, and had a median diameter d50 of the crystal grains of less than 100 nm, and hence corresponded to the Example. It was confirmed that a tool using the cubic boron nitride polycrystalline bodies of Sample 1 to Sample 3, Sample 7, Sample 8, Sample 9, and Sample 10 had a large number of dimples, and even in precision machining, the tool was not susceptible to damage and had a long tool life.

[Sample 4 and Sample 5]

The production methods of Sample 4 and Sample 5 both correspond to Comparative Examples in which the entry temperature into the stable region of wurtzite boron nitride is less than 900° C. The cubic boron nitride polycrystalline bodies of Sample 4 and Sample 5 each had a cubic boron nitride dislocation density of more than $8 \times 10^{15}/m^2$, which corresponds to a Comparative Example. A tool using the cubic boron nitride polycrystalline bodies of Sample 4 and Sample 5 had a small number of dimples and had a short tool life. This is thought to be because the cubic boron nitride polycrystalline bodies of Sample 4 and Sample 5 have a large cubic boron nitride dislocation density, which reduces toughness, so that the tool is easily damaged, resulting in deterioration of the surface roughness of the machined surface of the work material. It is thought that the reason why the cubic boron nitride has a high dislocation density is that in the production methods of Sample 4 and Sample 5, the entry temperature into the stable region of wurtzite boron nitride is less than 900° C., so lattice defects tend to occur.

When comparing the number of dimples of Sample 4 and Sample 5, Sample 5 had less. It is thought that the reason for this is because in the production method of Sample 5, heating and pressurization were each performed only once, and the entry temperature into the stable region of wurtzite boron nitride was lower than that of Sample 4, lattice defects were more likely to occur than in the production method of Sample 4, resulting in an increase in the cubic boron nitride dislocation density, a decrease in toughness, and the tool to become more easily damaged, and as a result, the surface roughness of the machined surface of the work material deteriorated.

[Sample 6]

The production method of Sample 6 corresponds to a Comparative Example in which the attainment temperature of the second step (attainment temperature of the third stage) is less than 1500° C. The polycrystalline cubic boron nitride of Sample 6 had a cubic boron nitride content of less than 96% by volume, which corresponds to a Comparative Example. A tool using the polycrystalline cubic boron nitride of Sample 6 had a small number of dimples and had a short tool life. This is thought to be because the polycrystalline cubic boron nitride of Sample 6 has a small cubic boron nitride content, which reduces strength and thermal diffusivity, so that the tool is easily damaged, resulting in deterioration of the surface roughness of the machined surface of the work material. It is thought that the reason for the low cubic boron nitride content is that because the attainment temperature of the second step was less than 1500° C., the conversion rate into cubic boron nitride was reduced.

[Sample 11]

The production method of Sample 11 corresponds to a Comparative Example in which the attainment pressure of the second step (attainment pressure of the third stage) is less than 10 GPa. The polycrystalline cubic boron nitride of Sample 11 had a cubic boron nitride content of less than 96% by volume, which corresponds to a Comparative Example. A tool using the polycrystalline cubic boron nitride of Sample 11 had a small number of dimples and had a short tool life. This is thought to be because the polycrystalline cubic boron nitride of Sample 11 has a small cubic boron nitride content, which reduces strength and thermal diffusivity, so that the tool is easily damaged, resulting in deterioration of the surface roughness of the machined surface of the work material. It is thought that the reason for the low cubic boron nitride content is that because the attainment pressure of the second step was less than 10 GPa, the conversion rate into cubic boron nitride was reduced.

Example 2

In Example 2, the relationship among the production conditions of the above-described production method (2) of a polycrystalline cubic boron nitride, the structure (composition, median diameter of crystal grains, and dislocation density) of the obtained polycrystalline cubic boron nitride, and tool life when performing precision machining with a tool using the polycrystalline cubic boron nitride was investigated.

<Production of Polycrystalline Cubic Boron Nitride>

The cubic boron nitride polycrystalline bodies of Sample 12 to Sample 15 were manufactured according to the following procedure.

(Step A)

Six grams of pyrolytic boron nitride was prepared. The pyrolytic boron nitride was placed into a molybdenum capsule and arranged in an ultrahigh pressure and high temperature generator.

(Step B and step C)

[Sample 12 to Sample 15]

Using the above-described pyrolytic boron nitride and ultrahigh pressure and high temperature generator, while maintaining the pressure at the pressure shown in the "pressure" column of the "starting point" in Table 1, the temperature was increased from the temperature shown in the "temperature" column of the "starting point" to the "attainment temperature" column of the "first stage".

Then, while maintaining the temperature, the pressure was increased to the pressure shown in the "attainment pressure" column of the "second stage" in Table 1.

Then, while maintaining the pressure, the temperature was increased to the temperature shown in the "attainment temperature" column of the "third stage" in Table 1 and held for 15 minutes, whereby polycrystalline cubic boron nitride was obtained. In Sample 12 to 15, the high temperature/high pressure treatment for 15 minutes at the "attainment temperature" and "attainment pressure" shown in the "third stage" corresponds to step C.

<Evaluation>

(Measurement of Composition, Dislocation Density, and Median Diameter d50 of Crystal Grains)

The cubic boron nitride content, the cubic boron nitride dislocation density, and the median diameter d50 of crystal grains for the obtained cubic boron nitride polycrystalline bodies were measured. Since the specific measurement methods are as shown in the first embodiment, a description thereof will not be repeated here. The results are shown in the "cBN content", "dislocation density", and "median diameter (d50)" columns of Table 2.

(Cutting Test)

The obtained cubic boron nitride polycrystalline bodies were cut with a laser and finished to manufacture a ball end mill. Using this ball end mill, spherical machining of ELMAX Steel® (manufactured by Uddeholm, chrome-vanadium-molybdenum alloy steel) was performed under the following cutting conditions to evaluate tool performance.

(Cutting Conditions)
Work material: ELMAX Steel® (manufactured by Uddeholm, chrome-vanadium-molybdenum alloy steel)
Tool shape: Ball end mill, R 0.5 mm per blade
Rotation speed: 42000 rpm
Feed: 1000 mm/min
Depth of cut (ap): 0.005 mm
Cutting width (ae): 0.005 mm
With oil mist
Machined into a φ8 hemispherical shape These cutting conditions correspond to precision machining.

(Tool Performance Evaluation)

The work material was cut under the cutting conditions described above, and the number of dimples having a φ8 hemispherical shape until the surface roughness Ra of the machined surface of the work material exceeded 0.15 μm was measured. A larger number of dimples indicates better damage resistance and a longer tool life. Since the specific method for measuring the surface roughness Ra of the machined surface is the same as the method described in Example 1, a description thereof will not be repeated here.

The results are shown in the "number of dimples" column of Table 2.

talline cubic boron nitride of Sample 12 has a small cubic boron nitride content, which reduces strength and thermal diffusivity, so that the tool is easily damaged, resulting in deterioration of the surface roughness of the machined surface of the work material. It is thought that the reason for the small cubic boron nitride content is that because the attainment temperature and attainment pressure of step B did not satisfy the condition of Formula 4 and the final sintering temperature was low, the conversion rate into cubic boron nitride was reduced.

[Sample 15]

The production method of Sample 15 corresponds to a Comparative Example in which the attainment temperature and the attainment pressure of step B (attainment temperature and attainment pressure of the third stage) do not satisfy the condition of Formula 5. The polycrystalline cubic boron nitride of Sample 15 had a median diameter d50 of the crystal grains of 100 nm or more, which corresponds to a Comparative Example. A tool using the polycrystalline cubic boron nitride of Sample 15 had a small number of dimples and had a short tool life. This is thought to be because the polycrystalline cubic boron nitride of Sample 15 has a median diameter d50 of the crystal grains of 100 nm or more, which slightly reduces strength and resistance to

TABLE 2

| | Heating and pressurizing path | | | | | | | | Polycrystalline cubic boron nitride | | | Evaluation |
|---|---|---|---|---|---|---|---|---|---|---|---|---|
| | Starting point | | First stage | | Second stage | | Third stage | | | | | |
| | | | Attainment | Attainment | Attainment | Attainment | Attainment | Attainment | wBN Stable | cBN | Median | Dislo- | Number |
| Sample No. | Temperature (° C.) | Pressure (GPa) | temperature (° C.) | pressure (GPa) | temperature (° C.) | pressure (GPa) | temperature (° C.) | pressure (GPa) | region entry temperature (° C.) | content (% by volume) | diameter (d50) (nm) | cation density ($\times 10^{15}/m^2$) | of dimples (number) |
| 12 | 25 | 0 | 1000 | 0 | 1000 | 16 | 1550 | 16 | 1000 | 95.6 | 55 | 6.1 | 12 |
| 13 | 25 | 0 | 1000 | 0 | 1000 | 16 | 1650 | 16 | 1000 | 96.5 | 68 | 6.0 | 32 |
| 14 | 25 | 0 | 1000 | 0 | 1000 | 16 | 2150 | 16 | 1000 | 97.1 | 92 | 5.8 | 33 |
| 15 | 25 | 0 | 1000 | 0 | 1000 | 16 | 2250 | 16 | 1000 | 97.5 | 114 | 5.8 | 21 |

<Consideration>

[Sample 13 and Sample 14]

The production method of each of Sample 13 and Sample 14 corresponded to the Example. The cubic boron nitride polycrystalline bodies of Sample 13 and Sample 14 both included 96% by volume or more of cubic boron nitride, had a cubic boron nitride dislocation density of $8 \times 10^{15}/m^2$ or less, and had a median diameter d50 of the crystal grains of less than 100 nm, and hence corresponded to the Example. It was confirmed that a tool using the cubic boron nitride polycrystalline bodies of Sample 13 and Sample 14 had a large number of dimples, and even in precision machining, the tool was not susceptible to damage and had a long tool life.

[Sample 12]

The production method of Sample 12 corresponds to a Comparative Example in which the attainment temperature and the attainment pressure of step B (attainment temperature and attainment pressure of the third stage) do not satisfy the condition of Formula 4. The polycrystalline cubic boron nitride of Sample 12 had a cubic boron nitride content of less than 96% by volume, which corresponds to a Comparative Example. A tool using the polycrystalline cubic boron nitride of Sample 12 had a small number of dimples and had a short tool life. This is thought to be because the polycrysdamage, resulting in deterioration of the surface roughness of the machined surface of the work material. It is thought that the reason for the large median diameter d50 of the crystal grains is that because the attainment temperature and attainment pressure of step B did not satisfy the condition of Formula 5 and the final sintering temperature was high, crystal grain growth progressed.

Example 3

In Example 3, the relationship among the production conditions of the above-described method (1) for manufacturing a polycrystalline cubic boron nitride, the structure (composition (cubic boron nitride content, hexagonal boron nitride content, and wurtzite boron nitride content), median diameter of crystal grains, and dislocation density) of the obtained polycrystalline cubic boron nitride, and tool life when performing precision machining with a tool using the polycrystalline cubic boron nitride was investigated.

<Production of Polycrystalline Cubic Boron Nitride>

The cubic boron nitride polycrystalline bodies of Sample 16 to Sample 20 were manufactured according to the following procedure.

[Sample 16 to Sample 20]
(First Step)
Six grams of a hexagonal boron nitride powder (median diameter d90: 0.3 μm) was prepared. The hexagonal boron nitride powder was placed into a molybdenum capsule and arranged in an ultrahigh pressure and high temperature generator.

(Second Step and Third Step)
Using the above-described hexagonal boron nitride powder and ultrahigh pressure and high temperature generator, while maintaining the pressure at the pressure shown in the "pressure" column of the "starting point" in Table 3, the temperature was increased from the temperature shown in the "temperature" column of the "starting point" to the "attainment temperature" column of the "first stage".

Then, while maintaining the temperature, the pressure was increased to the pressure shown in the "attainment pressure" column of the "second stage" in Table 3.

Then, while maintaining the pressure, the temperature was increased to the temperature shown in the "attainment temperature" column of the "third stage" in Table 3 and held for the time shown in the "holding time" column of the table, whereby polycrystalline cubic boron nitride was obtained. In Samples 16 to 20, the high temperature/high pressure treatment for 15 minutes at the "attainment temperature" and "attainment pressure" shown in the "third stage" corresponds to the third step.

<Evaluation>
(Measurement of Composition, Dislocation Density, and Median Diameter d50 of Crystal Grains)
The composition (cubic boron nitride content, hexagonal boron nitride content, and wurtzite boron nitride content), the cubic boron nitride dislocation density, and the median diameter d50 of crystal grains for the obtained cubic boron nitride polycrystalline bodies were measured. Since the specific measurement methods are as shown in the first embodiment, a description thereof will not be repeated here. The results are shown in the "cBN content", "hBN content", "compressed hBN content", "wBN content", "dislocation density", and "median diameter (d50)" columns of Table 3.

(Cutting Test)
The obtained cubic boron nitride polycrystalline bodies were cut with a laser and finished to manufacture a ball end mill. Using this ball end mill, spherical machining of ELMAX Steel® (manufactured by Uddeholm, chrome-vanadium-molybdenum alloy steel) was performed under the following cutting conditions to evaluate tool performance.

(Cutting Conditions)
Work material: ELMAX Steel® (manufactured by Uddeholm, chrome-vanadium-molybdenum alloy steel)
Tool shape: Ball end mill, R 0.6 mm per blade
Rotation speed: 12000 rpm
Feed: 1000 mm/min
Depth of cut (ap): 0.005 mm
Cutting width (ae): 0.005 mm
With oil mist
Machined into a ϕ8 hemispherical shape These cutting conditions correspond to precision machining. Further, in these conditions, the rotation speed is lower and the cutting resistance is higher than in the cutting tests in Example 1 and Example 2.

(Tool Performance Evaluation)
The work material was cut under the cutting conditions described above, and the number of dimples having a ϕ12 hemispherical shape until the surface roughness Ra of the machined surface of the work material exceeded 0.2 μm was measured. A larger number of dimples indicates better damage resistance and a longer tool life. Since the specific method for measuring the surface roughness Ra of the machined surface is the same as the method described in Example 1, a description thereof will not be repeated here. The results are shown in the "number of dimples" column of Table 3.

TABLE 3

| | | | First stage | | Second stage | | Third stage | | | wBN Stable |
|---|---|---|---|---|---|---|---|---|---|---|
| | Starting point | | Attainment | Attainment | Attainment | Attainment | Attainment | Attainment | Holding | region entry |
| Sample No. | Temperature (° C.) | Pressure (GPa) | temperature (° C.) | pressure (GPa) | temperature (° C.) | pressure (GPa) | temperature (° C.) | pressure (GPa) | time (min) | temperature (° C.) |
| 16 | 25 | 0 | 950 | 0 | 950 | 11 | 1750 | 11 | 10 | 950 |
| 17 | 25 | 0 | 1210 | 0 | 1210 | 14 | 1650 | 14 | 20 | 1210 |
| 18 | 25 | 0 | 1000 | 0 | 1000 | 14 | 1950 | 14 | 20 | 1000 |
| 19 | 25 | 0 | 950 | 0 | 950 | 9 | 1750 | 9 | 20 | 950 |
| 20 | 25 | 0 | 1000 | 0 | 1000 | 14 | 2350 | 14 | 20 | 1000 |

| | Polycrystalline cubic boron nitride | | | | | | Evaluation |
|---|---|---|---|---|---|---|---|
| Sample No. | cBN content (% by volume) | hBN content (% by volume) | Compressed hBN content (% by volume) | wBN content (% by volume) | Median diameter (d50) (nm) | Dislocation density (×10$^{15}$/m$^2$) | Number of dimples (number) |
| 16 | 96.2 | 0.02 | 0.3 | 3.48 | 81 | 7.8 | 15 |
| 17 | 97 | 0 | 0.3 | 2.7 | 71 | 7.1 | 18 |
| 18 | 96.8 | 0 | 0 | 3.2 | 96 | 7.6 | 22 |
| 19 | 95.4 | 0.5 | 2.4 | 1.7 | 78 | 7.7 | 5 |
| 20 | 100 | 0 | 0 | 0 | 420 | 4.1 | 2 |

<Consideration>
[Sample 16 to Sample 18]
The production method of each of Sample 16 to Sample 18 corresponded to the Example. The cubic boron nitride polycrystalline bodies of Sample 16 to Sample 18 all included 96% by volume or more of cubic boron nitride, had a cubic boron nitride dislocation density of 8×10$^{15}$/m$^2$ or less, and had a median diameter d50 of the crystal grains of less than 100 nm, and hence corresponded to the Example. It was confirmed that a tool using the cubic boron nitride polycrystalline bodies of Sample 16 to Sample 18 had a large number of dimples, and even in precision machining, the tool was not susceptible to damage and had a long tool life.

[Sample 19]

The production method of Sample 19 corresponds to a Comparative Example in which the attainment pressure of the second step (attainment pressure of the third stage) is less than 10 GPa. The polycrystalline cubic boron nitride of Sample 19 had a cubic boron nitride content of less than 96% by volume, which corresponds to a Comparative Example. A tool using the polycrystalline cubic boron nitride of Sample 19 had a small number of dimples and had a short tool life. This is thought to be because the polycrystalline cubic boron nitride of Sample 19 has a small cubic boron nitride content, which reduces strength and thermal diffusivity, so that the tool is easily damaged, resulting in deterioration of the surface roughness of the machined surface of the work material. It is thought that the reason for the low cubic boron nitride content is that because the attainment pressure of the heating and pressurizing step was less than 10 GPa, the conversion rate into cubic boron nitride was reduced.

[Sample 20]

The production method of Sample 20 corresponds to a Comparative Example in which the attainment temperature of the second step (attainment temperature of the third stage) is higher than 2200° C. The polycrystalline cubic boron nitride of Sample 20 had a median diameter d50 of the crystal grains of more than 100 nm, which corresponds to a Comparative Example. A tool using the polycrystalline cubic boron nitride of Sample 20 had a small number of dimples and had a short tool life. This is thought to be because the polycrystalline cubic boron nitride of Sample 20 had a large median diameter d50 of the crystal grains, which reduces strength and resistance to damage, and because it did not include hexagonal boron nitride, compressed hexagonal boron nitride, and wurtzite boron nitride, cutting resistance is increased and the tool is easily damaged, resulting in deterioration of the surface roughness of the machined surface of the work material.

Example 4

In Example 4, the relationship among the production conditions of the above-described method (1) for manufacturing a polycrystalline cubic boron nitride, the structure (composition, total content of alkali metal and alkaline earth metal, median diameter of crystal grains, and dislocation density) of the obtained polycrystalline cubic boron nitride, and tool life when performing precision machining with a tool using the polycrystalline cubic boron nitride was investigated.

<Production of Polycrystalline Cubic Boron Nitride>

The cubic boron nitride polycrystalline bodies of Sample 21 to Sample 23 were manufactured according to the following procedure.

(First Step)

[Sample 21 and Sample 22]

Six grams of a hexagonal boron nitride powder (median diameter d90: 0.3 μm) was prepared. The hexagonal boron nitride powder was placed into a molybdenum capsule and arranged in an ultrahigh pressure and high temperature generator.

[Sample 23]

Six grams of a cubic boron nitride powder (median diameter d90: 3 μm) including a total of more than 10 ppm of alkali metal and alkaline earth metal was prepared. The cubic boron nitride powder was held under an argon atmosphere at a temperature of 1900° C. for 1 hour to convert the cubic boron nitride back into hexagonal boron nitride to obtain a hexagonal boron nitride powder. The hexagonal boron nitride powder was placed into a molybdenum capsule and arranged in an ultrahigh pressure and high temperature generator.

(Second Step and Third Step)

Using the above-described hexagonal boron nitride powder and ultrahigh pressure and high temperature generator, while maintaining the pressure at the pressure shown in the "pressure" column of the "starting point" in Table 4, the temperature was increased from the temperature shown in the "temperature" column of the "starting point" to the "attainment temperature" column of the "first stage".

Then, while maintaining the temperature, the pressure was increased to the pressure shown in the "attainment pressure" column of the "second stage" in Table 4.

Then, while maintaining the pressure, the temperature was increased to the temperature shown in the "attainment temperature" column of the "third stage" in Table 4 and held for the duration shown in the "holding time" column, whereby polycrystalline cubic boron nitride was obtained. In Samples 21 to 23, the high temperature/high pressure treatment at the "attainment temperature", "attainment pressure", and "holding time" shown in the "third stage" corresponds to the third step.

<Evaluation>

(Measurement of Composition, Dislocation Density, and Median Diameter d50 of Crystal Grains)

The composition (cubic boron nitride content, hexagonal boron nitride content, and wurtzite boron nitride content), the cubic boron nitride dislocation density, and the median diameter d50 of crystal grains for the obtained cubic boron nitride polycrystalline bodies were measured. Since the specific measurement methods are as shown in the first embodiment, a description thereof will not be repeated here. The results are shown in the "cBN content", "hBN content", "compressed hBN content", "wBN content", "dislocation density", and "median diameter (d50)" columns of Table 3.

(Measurement of Total Content of Alkali Metal Elements and Alkaline Earth Metal Elements)

The total content of alkali metal elements and alkaline earth metal elements in the obtained cubic boron nitride polycrystalline bodies was measured by SIMS. Since the specific measurement method is as described in the first embodiment, a description thereof will not be repeated here. The total content of alkali metal elements and alkaline earth metal elements is shown in the "alkali metal/alkaline earth metal content" column of Table 4.

(Cutting Test)

The obtained cubic boron nitride polycrystalline bodies were cut with a laser and finished to manufacture a ball end mill. Using this ball end mill, spherical machining of ELMAX Steel® (manufactured by Uddeholm, chrome-vanadium-molybdenum alloy steel) was performed under the following cutting conditions to evaluate tool performance.

(Cutting Conditions)

Work material: ELMAX Steel® (manufactured by Uddeholm, chrome-vanadium-molybdenum alloy steel)
Tool shape: Ball end mill, R 0.6 mm per blade
Rotation speed: 50000 rpm
Feed: 1000 mm/min Depth of cut (ap): 0.005 mm
Cutting width (ae): 0.005 mm
With oil mist
Machined into a ϕ12 hemispherical shape These cutting conditions correspond to precision machining. Further, in these conditions, the rotation speed is higher and the blade edge tends to be hotter than in the cutting tests in Example 1 and Example 2.

(Tool Performance Evaluation)

The work material was cut under the cutting conditions described above, and the number of dimples having a ϕ12 hemispherical shape until the surface roughness Ra of the machined surface of the work material exceeded 0.2 μm was measured. A larger number of dimples indicates better wear resistance and a longer tool life. Since the specific method for measuring the surface roughness Ra of the machined surface is the same as the method described in Example 1, a description thereof will not be repeated here. The results are shown in the "number of dimples" column of Table 4.

even in precision machining under conditions in which the blade edge tends to become hot, tool life was good.

When comparing Sample 21 to Sample 23, Sample 21 and Sample 22 had a longer tool life than Sample 23. It is thought that this is because in the polycrystalline cubic boron nitride of Sample 21 and Sample 22, the content of alkali metal elements and alkaline earth metal elements was 10 ppm or less, so that even in precision machining under conditions in which the blade edge tends to become hot, conversion from hexagonal boron nitride into cubic boron nitride due to alkali metal elements and alkaline earth metal elements is less likely to occur, and damage to the tool can be better prevented from progressing.

Sample 21 and Sample 22 differed in terms of their composition, total content of alkali metal elements and alkaline earth metal elements, median diameter d50 of the crystal grains, and dislocation density of the cubic boron nitride. It is thought that this is due to variations in, for

TABLE 4

| | | Heating and pressurizing path | | | | | | | wBN Stable |
|---|---|---|---|---|---|---|---|---|---|
| | Starting point | First stage | | Second stage | | Third stage | | | region entry |
| Sample No. | Temperature (° C.) | Pressure (GPa) | Attainment temperature (° C.) | Attainment pressure (GPa) | Attainment temperature (° C.) | Attainment pressure (GPa) | Attainment temperature (° C.) | Attainment pressure (GPa) | Holding time (min) | temperature (° C.) |
| 21 | 25 | 0 | 1210 | 0 | 1210 | 14 | 1750 | 14 | 10 | 1210 |
| 22 | 25 | 0 | 1210 | 0 | 1210 | 14 | 1750 | 14 | 10 | 1210 |
| 23 | 25 | 0 | 1210 | 0 | 1210 | 14 | 1750 | 14 | 10 | 1210 |

| | Polycrystalline cubic boron nitride | | | | | | | |
|---|---|---|---|---|---|---|---|---|
| Sample No. | cBN content (% by volume) | hBN content (% by volume) | Compressed hBN content (% by volume) | wBN content (% by volume) | Content of alkali metal elements/alkaline earth metal elements (ppm) | Median diameter (d50) (nm) | Dislocation density ($\times 10^{15}/m^2$) | Evaluation Number of dimples (number) |
| 21 | 98.1 | 0 | 0.1 | 1.8 | 4 | 80 | 6.7 | 20 |
| 22 | 98.2 | 0 | 0.1 | 1.7 | 8 | 79 | 6.9 | 18 |
| 23 | 98.1 | 0 | 0.1 | 1.8 | 18 | 81 | 7 | 11 |

<Consideration>

[Sample 21 and Sample 22]

The production method of each of Sample 21 and Sample 22 corresponded to the Example. The cubic boron nitride polycrystalline bodies of Sample 21 and Sample 22 all included 96% by volume or more of cubic boron nitride, had a cubic boron nitride dislocation density of $8\times10^{15}/m^2$ or less, and had a median diameter d50 of the crystal grains of less than 100 nm, and hence corresponded to the Example. It was confirmed that a tool using the cubic boron nitride polycrystalline bodies of Sample 21 and Sample 22 had a large number of dimples, and even in precision machining under conditions in which the blade edge tends to become hot, the tool was not susceptible to damage and had a long tool life.

[Sample 23]

The polycrystalline cubic boron nitride of Sample 23 included 96% by volume or more of cubic boron nitride, had a cubic boron nitride dislocation density of $8\times10^{15}/m^2$ or less, and had a median diameter d50 of the crystal grains of less than 100 nm, and hence corresponded to the Example. It was confirmed that a tool using the polycrystalline cubic boron nitride of Sample 23 had 11 or more dimples, and example, the amount of impurities and the particle size of the raw material hexagonal boron nitride.

Although embodiments and Examples of the present disclosure have been described above, from the beginning it has been planned that various configurations of the above-described embodiments and Examples may be appropriately combined and variously modified.

The embodiments and Examples disclosed this time are to be considered as illustrative in all points and are not restrictive. The scope of the present disclosure is shown not by the embodiments and examples described above but by the claims, and it is intended meanings equivalent to the claims and all modifications are also included within the scope of the present disclosure.

The invention claimed is:

1. A polycrystalline cubic boron nitride comprising 96% by volume or more of cubic boron nitride, wherein
    the cubic boron nitride has a dislocation density of $8\times10^{15}/m^2$ or less,
    the polycrystalline cubic boron nitride comprises a plurality of crystal grains, and
    the plurality of crystal grains have a median diameter d50 of an equivalent circle diameter of less than 100 nm.

2. The polycrystalline cubic boron nitride according to claim 1, wherein the dislocation density is $7\times10^{15}/m^2$ or less.

3. The polycrystalline cubic boron nitride according to claim 1, wherein the polycrystalline cubic boron nitride comprises 0.01% by volume or more of hexagonal boron nitride.

4. The polycrystalline cubic boron nitride according to claim 1, wherein the polycrystalline cubic boron nitride comprises 0.01% by volume or more of compressed hexagonal boron nitride.

5. The polycrystalline cubic boron nitride according to claim 1, wherein the polycrystalline cubic boron nitride comprises 0.1% by volume or more of wurtzite boron nitride.

6. The polycrystalline cubic boron nitride according to claim 1, wherein the polycrystalline cubic boron nitride comprises a total content of an alkali metal element and an alkaline earth metal element of 10 ppm or less in terms of mass.

7. The polycrystalline cubic boron nitride according to claim 1, wherein the dislocation density is calculated by using a modified Williamson-Hall method and a modified Warren-Averbach method.

8. The polycrystalline cubic boron nitride according to claim 1, wherein the dislocation density is measured using synchrotron radiation as an X-ray source.

9. A method for manufacturing the polycrystalline cubic boron nitride according to claim 1, comprising:
a first step of preparing a hexagonal boron nitride powder having a d90 of an equivalent circle diameter of 0.3 μm or less; and
a second step of heating and pressurizing the hexagonal boron nitride powder to a temperature greater than or equal to 1500° C. and less than or equal to 2200° C. and to a pressure greater than or equal to 10 GPa, with the temperature and the pressure passing through a temperature and a pressure in a stable region of a wurtzite boron nitride to obtain the polycrystalline cubic boron nitride, in the heating and pressurizing path of the second step, an entry temperature into the stable region of wurtzite boron nitride is 900° C. or more and the entry temperature into the stable region of the wurtzite boron nitride is held for a predetermined period of time, wherein
the stable region of wurtzite boron nitride is, when the temperature is represented as T° C. and the pressure as P GPa, a region that simultaneously satisfies the following Formula 1 and Formula 2, $P \geq -0.0037T+11.301$  Formula 1:

$P \leq -0.085T+117$  Formula 2:.

10. The method for manufacturing the polycrystalline cubic boron nitride according to claim 9, wherein the entry temperature is 1200° C. or more.

11. The method for manufacturing the polycrystalline cubic boron nitride according to claim 9, further comprising a third step of, after the second step, holding the polycrystalline cubic boron nitride obtained in the second step for 10 minutes or more and 30 minutes or less under conditions of a temperature of 1500° C. or more and 2200° C. or less and a pressure of 10 GPa or more.

12. A method for manufacturing the polycrystalline cubic boron nitride according to claim 1, comprising:
a step A of preparing pyrolytic boron nitride; and
a step B of heating and pressurizing the pyrolytic boron nitride to a temperature and a pressure in a final sintering region, with the temperature and the pressure passing through a temperature and a pressure in a stable region of a wurtzite boron nitride to obtain the polycrystalline cubic boron nitride, in the heating and pressurizing path of step B, an entry temperature into the stable region of wurtzite boron nitride is 900° C. or more and the entry temperature into the stable region of the wurtzite boron nitride is held for a predetermined period of time, wherein
the stable region of wurtzite boron nitride is, when the temperature is represented as T° C. and the pressure as P GPa, a region that simultaneously satisfies the following Formula 1 and Formula 2, $P \geq -0.0037T+11.301$  Formula 1:

$P \leq -0.085T+117$  Formula 2:

the final sintering region is, when the temperature is represented as T° C. and the pressure as P GPa, a region that simultaneously satisfies the following Formula 3, Formula 4, and Formula 5, $P \geq 12$  Formula 3:

$P \geq -0.085T+151$  Formula 4:

$P \leq -0.085T+202$  Formula 5:.

13. The method for manufacturing the polycrystalline cubic boron nitride according to claim 12, wherein the entry temperature is 1200° C. or more.

14. The method for manufacturing the polycrystalline cubic boron nitride according to claim 12, further comprising a step C of, after step B, holding the polycrystalline cubic boron nitride obtained in step B for 10 minutes or more and 30 minutes or less under conditions of a temperature and a pressure in the final sintering region.

* * * * *